US009900078B2

(12) United States Patent
Wu et al.

(10) Patent No.: US 9,900,078 B2
(45) Date of Patent: Feb. 20, 2018

(54) DATA PROCESSING METHOD, APPARATUS, AND DEVICE

(71) Applicant: Huawei Technologies Co., Ltd., Shenzhen (CN)

(72) Inventors: Yiqun Wu, Shanghai (CN); Shunqing Zhang, Shenzhen (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/620,041

(22) Filed: Jun. 12, 2017

(65) Prior Publication Data

US 2017/0279515 A1    Sep. 28, 2017

Related U.S. Application Data

(63) Continuation of application No. PCT/CN2014/093534, filed on Dec. 11, 2014.

(51) Int. Cl.
*H04L 25/34* (2006.01)
*H04B 7/06* (2006.01)
*H04L 1/02* (2006.01)
*H04B 7/0456* (2017.01)

(52) U.S. Cl.
CPC ......... *H04B 7/0689* (2013.01); *H04B 7/0456* (2013.01); *H04L 1/02* (2013.01)

(58) Field of Classification Search
CPC ... H04L 5/0023; H04L 1/1861; H04L 1/0031; H04L 25/03929; H04L 5/0005;

(Continued)

(56) References Cited

U.S. PATENT DOCUMENTS

2010/0172433 A1   7/2010 Li et al.
2011/0310780 A1*  12/2011 Xiao .................... H04L 1/0028
                                                          370/310

(Continued)

FOREIGN PATENT DOCUMENTS

CN    101494527 A    7/2009
CN    101521514 A    9/2009
CN    101771418 A    7/2010
CN    102299769 A   12/2011
CN    103119877 A    5/2013

OTHER PUBLICATIONS

Machine Translation and Abstract of Chinese Publication No. CN101494527, Jul. 29, 2009, 19 pages.

(Continued)

*Primary Examiner* — Rahel Guarino
(74) *Attorney, Agent, or Firm* — Conley Rose, P.C.

(57) ABSTRACT

A data processing method, including performing, by a transmit end device, mapping processing on L layers of information bits to generate L layers of modulation symbol sequences, where each layer of modulation symbol sequence includes U modulation symbols, the L layers of modulation symbol sequences correspond to a same time-frequency resource, and the U modulation symbols include at least one non-zero modulation symbol and at least one zero modulation symbol, performing precoding processing on each layer of modulation symbol sequence according to a precoding matrix to generate L layers of modulation symbol sequence matrixes, and performing superposition processing on the L layers of modulation symbol sequence matrixes to generate a to-be-sent symbol sequence matrix, where the to-be-sent symbol sequence matrix includes T element sequences in a first dimension, and the to-be-sent symbol sequence matrix includes U element sequences in a second dimension.

20 Claims, 5 Drawing Sheets

(58) Field of Classification Search
CPC ......... H04L 1/1893; H04L 2025/03426; H04L 1/06; H04W 72/04; H04W 72/0446; H04B 7/0456; H04B 7/0413; H04B 7/0473
USPC .................. 375/267, 260, 299, 347; 455/101
See application file for complete search history.

(56) References Cited

U.S. PATENT DOCUMENTS

| | | |
|---|---|---|
| 2014/0169408 A1 | 6/2014 | Bayesteh et al. |
| 2014/0169409 A1 | 6/2014 | Ma et al. |
| 2014/0313994 A1 | 10/2014 | Su et al. |

OTHER PUBLICATIONS

Machine Translation and Abstract of Chinese Publication No. CN101521514, Sep. 2, 2009, 10 pages.
Foreign Communication From a Counterpart Application, PCT Application No. PCT/CN2014/093534, English Translation of International Search Report dated Jul. 28, 2015, 2 pages.
Foreign Communication From a Counterpart Application, PCT Application No. PCT/CN2014/093534, English Translation of Written Opinion dated Jul. 28, 2015, 5 pages.
Nikopour, H., et al., "SCMA for Downlink Multiple Access of 5G Wireless Networks," XP002769939, Globecom—Wireless Communications Symposium, Jan. 2014, pp. 3940-3945.
Foreign Communication From a Counterpart Application, European Application No. 14907779.4, Extended European Search Report dated Nov. 20, 2017, 8 pages.

* cited by examiner

200

A transmit end device performs mapping processing on L layers of information bits in order to generate L layers of modulation symbol sequences, where each layer of modulation symbol sequence includes U modulation symbols, the L layers of modulation symbol sequences correspond to a same time-frequency resource, the U modulation symbols include at least one non-zero modulation symbol and at least one zero modulation symbol, $L \geq 2$, and $U \geq 2$ — S210

Perform precoding processing on each layer of modulation symbol sequence according to a precoding matrix that corresponds to each layer of modulation symbol sequence and that is in L precoding matrixes in order to generate L layers of modulation symbol sequence matrixes, where the L precoding matrixes are in a one-to-one correspondence with the L layers of modulation symbol sequences, the precoding matrix includes T element sequences in a first dimension, T is a quantity of space domain resources used to transmit the L layers of information bits, and $T \geq 2$ — S220

Perform superposition processing on the L layers of modulation symbol sequence matrixes in order to generate a to-be-sent symbol sequence matrix, where the to-be-sent symbol sequence matrix includes T element sequences in the first dimension, and the to-be-sent symbol sequence matrix includes U element sequences in a second dimension — S230

FIG. 2

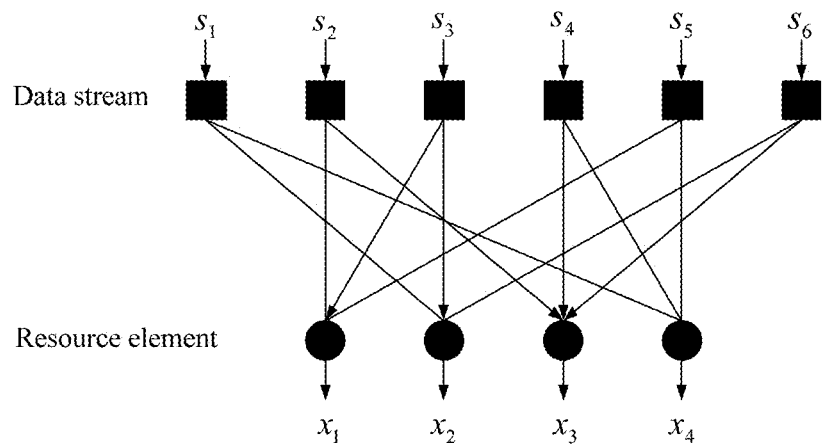

FIG. 3

DATA PROCESSING METHOD, APPARATUS, AND DEVICE

CROSS-REFERENCE TO RELATED APPLICATION

This application is a continuation of International Patent Application No. PCT/CN2014/093534 filed on Dec. 11, 2014, which is hereby incorporated by reference in its entirety.

TECHNICAL FIELD

The present disclosure relates to the communications field, and in particular, to a data processing method, apparatus, and device.

BACKGROUND

With development of technologies, in a technology such as a sparse code multiple access (SCMA) technology or an orthogonal frequency division multiplexing (OFDM) technology, multiple terminal devices have been allowed to multiplex a same time-frequency resource to transmit data, that is, a transmit end device may perform encoding and modulation on multiple layers of information bits that need to be transmitted in order to generate multiple layers of modulation symbols, and after performing superposition processing on the multiple layers of modulation symbols on the time-frequency resource, send the superposed modulation symbols to a receive end device using an air interface.

Currently, a multiple-input multiple-output (MIMO) technology is known, that is, a transmit end device and a receive end device may perform data transmission using multiple antenna ports, to improve a system capacity and transmission reliability.

Therefore, it is expected to combine the MIMO technology with a multiplexing technology such as SCMA or OFDM in order to further improve performance of a communications system.

How to combine the foregoing MIMO technology with the SCMA technology or the like in order to further improve the system capacity and transmission reliability is an urgent problem to be resolved.

A feasible solution is that after superposition processing is performed on multiple layers of modulation symbols on a time-frequency resource, a transmit end device may perform precoding processing on a generated signal that is carried on the time-frequency resource in order to generate transmit signals corresponding to antenna ports.

However, in this solution, a space diversity gain cannot be effectively used. For example, when signals of multiple terminal devices are carried on a same time-frequency resource, after the foregoing precoding processing is performed, signal components of multiple users are sent using a same port, respective optimal antenna ports of the signal components cannot be selected simultaneously, and mutual interference between components causes a relatively high bit error rate during decoding by a receive end, severely affecting communication reliability.

SUMMARY

Embodiments of the present disclosure provide a data processing method, apparatus, and device in order to fully use a space diversity gain.

According to a first aspect, a data processing method is provided, where the method includes performing, by a transmit end device, mapping processing on L layers of information bits in order to generate L layers of modulation symbol sequences, where each layer of modulation symbol sequence includes U modulation symbols, the L layers of modulation symbol sequences correspond to a same time-frequency resource, the U modulation symbols include at least one non-zero modulation symbol and at least one zero modulation symbol, $L \geq 2$, and $U \geq 2$, performing precoding processing on each layer of modulation symbol sequence according to a precoding matrix that corresponds to each layer of modulation symbol sequence and that is in L precoding matrixes in order to generate L layers of modulation symbol sequence matrixes, where the L precoding matrixes are in a one-to-one correspondence to the L layers of modulation symbol sequences, the precoding matrix includes T element sequences in a first dimension, T is a quantity of space domain resources used to transmit the L layers of information bits, and $T \geq 2$, and performing superposition processing on the L layers of modulation symbol sequence matrixes in order to generate a to-be-sent symbol sequence matrix, where the to-be-sent symbol matrix includes T element sequences in the first dimension, and the to-be-sent symbol sequence matrix includes U element sequences in a second dimension.

With reference to the first aspect, in a first implementation manner of the first aspect, when a first modulation symbol sequence in the L layers of modulation symbol sequences includes at least two non-zero modulation symbols, in a first precoding matrix corresponding to the first modulation symbol, the first precoding matrix includes at least two first element sequences in the second dimension, the at least two first element sequences are in a one-to-one correspondence to the at least two non-zero modulation symbols included in the first modulation symbol sequence, and the at least two first element sequences are different.

With reference to the first aspect and the first implementation manner, in a second implementation manner of the first aspect, the precoding matrix is determined according to a receive end device corresponding to each layer of modulation symbol sequence.

With reference to the first aspect and any of the first and the second implementation manner, in a third implementation manner of the first aspect, when a receive end device corresponding to a second modulation symbol sequence in the L layers of modulation symbol sequences is the same receive end device corresponding to a third modulation symbol sequence in the L layers of modulation symbol sequences, in a second precoding matrix corresponding to the second modulation symbol sequence, the second precoding matrix includes a second element sequence in the second dimension, the second element sequence corresponds to a second non-zero modulation symbol, and the second non-zero modulation symbol is a non-zero modulation symbol included in the second modulation symbol sequence, and in a third precoding matrix corresponding to the third modulation symbol sequence, the third precoding matrix includes a third element sequence in the second dimension, the third element sequence corresponds to a third non-zero modulation symbol, and the third non-zero modulation symbol is a non-zero modulation symbol included in the third modulation symbol sequence, where a location of the second non-zero modulation symbol in the second modulation symbol sequence corresponds to a location of the third non-zero modulation symbol in the third modulation symbol sequence, and the second element sequence is the same as the third element sequence.

With reference to the first aspect and any of the first to the third implementation manner, in a fourth implementation manner of the first aspect, when a receive end device corresponding to a fourth modulation symbol sequence in the L layers of modulation symbol sequences is different from a receive end device corresponding to a fifth modulation symbol sequence in the L layers of modulation symbol sequences, in a fourth precoding matrix corresponding to the fourth modulation symbol sequence, the fourth precoding matrix includes a fourth element sequence in the second dimension, the fourth element sequence corresponds to a fourth non-zero modulation symbol, and the fourth non-zero modulation symbol is a non-zero modulation symbol included in the fourth modulation symbol sequence, and in a fifth precoding matrix corresponding to the fifth modulation symbol sequence, the fifth precoding matrix includes a fifth element sequence in the second dimension, the fifth element sequence corresponds to a fifth non-zero modulation symbol, and the fifth non-zero modulation symbol is a non-zero modulation symbol included in the fifth modulation symbol sequence, where a location of the fourth non-zero modulation symbol in the fourth modulation symbol sequence corresponds to a location of the fifth non-zero modulation symbol in the fifth modulation symbol sequence, and the fourth element sequence is different from the fifth element sequence.

With reference to the first aspect and any of the first to the fourth implementation manner, in a fifth implementation manner of the first aspect, each precoding matrix includes U element sequences in the second dimension, and a location, in the U sequences, of a non-zero element sequence included in each precoding matrix corresponds to a location, in the U modulation symbols, of a non-zero modulation symbol included in a corresponding modulation symbol sequence, and performing superposition processing on the L layers of modulation symbol sequence matrixes includes performing superposition processing on elements that have corresponding locations in the first dimension and corresponding locations in the second dimension and that are in the L layers of modulation symbol sequence matrixes.

With reference to the first aspect and any of the first to the fifth implementation manner, in a sixth implementation manner of the first aspect, a sixth modulation symbol sequence in the L layers of modulation symbol sequences includes V non-zero modulation symbols, V≥1, and in a sixth precoding matrix corresponding to the sixth modulation symbol sequence, the sixth precoding matrix includes V element sequences in a second dimension, and performing precoding processing on each layer of modulation symbol sequence according to a precoding matrix corresponding to each layer of modulation symbol sequence includes performing precoding processing on the first modulation symbol sequence according to the first precoding matrix in order to generate a first modulation symbol sequence matrix, where the first modulation symbol sequence matrix includes T element sequences in the first dimension, and the first modulation symbol sequence matrix includes V element sequences in the second dimension.

With reference to the first aspect and any of the first to the sixth implementation manner, in a seventh implementation manner of the first aspect, before performing superposition processing on the L layers of modulation symbol sequence matrixes, the method further includes performing zero-fill processing on the sixth modulation symbol sequence matrix according to locations of the V non-zero modulation symbols in the sixth modulation symbol sequence such that a sixth modulation symbol sequence matrix obtained after zero-fill processing includes U element sequences in the second dimension, where locations, in the second dimension, of V non-zero element sequences in the first modulation symbol sequence matrix obtained after zero-fill processing correspond to the locations of the V non-zero modulation symbols in the sixth modulation symbol sequence.

With reference to the first aspect and any of the first to the seventh implementation manner, in an eighth implementation manner of the first aspect, T is further a quantity of antenna ports used to transmit the L layers of information bits.

With reference to the first aspect and any of the first to the eighth implementation manner, in a ninth implementation manner of the first aspect, the transmit end device is a network device, or the transmit end device is a terminal device.

With reference to the first aspect and any of the first to the ninth implementation manner, in a tenth implementation manner of the first aspect, mapping processing is mapping processing performed using a codeword, where the codeword is a multi-dimensional complex vector used to indicate a mapping relationship between an information bit and at least two modulation symbols, and the at least two modulation symbols include at least one zero modulation symbol and at least one non-zero modulation symbol.

According to a second aspect, a data processing apparatus is provided, where the apparatus includes a mapping processing unit configured to perform mapping processing on L layers of information bits in order to generate L layers of modulation symbol sequences, where each layer of modulation symbol sequence includes U modulation symbols, the L layers of modulation symbol sequences correspond to a same time-frequency resource, the U modulation symbols include at least one non-zero modulation symbol and at least one zero modulation symbol, L≥2, and U≥2, a precoding processing unit configured to perform precoding processing on each layer of modulation symbol sequence according to a precoding matrix that corresponds to each layer of modulation symbol sequence and that is in L precoding matrixes in order to generate L layers of modulation symbol sequence matrixes, where the L precoding matrixes are in a one-to-one correspondence to the L layers of modulation symbol sequences, the precoding matrix includes T element sequences in a first dimension, T is a quantity of space domain resources used to transmit the L layers of information bits, and T≥2, and a superposition processing unit configured to perform superposition processing on the L layers of modulation symbol sequence matrixes in order to generate a to-be-sent symbol sequence matrix, where the to-be-sent symbol sequence matrix includes T element sequences in the first dimension, and the to-be-sent symbol sequence matrix includes U element sequences in a second dimension.

With reference to the second aspect, in a first implementation manner of the second aspect, when a first modulation symbol sequence in the L layers of modulation symbol sequences includes at least two non-zero modulation symbols, in a first precoding matrix corresponding to the first modulation symbol, the first precoding matrix includes at least two first element sequences in the second dimension, the at least two first element sequences are in a one-to-one correspondence to the at least two non-zero modulation symbols included in the first modulation symbol sequence, and the at least two first element sequences are different.

With reference to the second aspect and the first implementation manner, in a second implementation manner of the second aspect, the precoding matrix is determined according to a receive end device corresponding to each layer of modulation symbol sequence.

With reference to the second aspect and any of the first and second implementation manner, in a third implementation manner of the second aspect, when a receive end device corresponding to a second modulation symbol sequence in the L layers of modulation symbol sequences is the same as a receive end device corresponding to a third modulation symbol sequence in the L layers of modulation symbol sequences, in a second precoding matrix corresponding to the second modulation symbol sequence, the second precoding matrix includes a second element sequence in the second dimension, the second element sequence corresponds to a second non-zero modulation symbol, and the second non-zero modulation symbol is a non-zero modulation symbol included in the second modulation symbol sequence, and in a third precoding matrix corresponding to the third modulation symbol sequence, the third precoding matrix includes a third element sequence in the second dimension, the third element sequence corresponds to a third non-zero modulation symbol, and the third non-zero modulation symbol is a non-zero modulation symbol included in the third modulation symbol sequence, where a location of the second non-zero modulation symbol in the second modulation symbol sequence corresponds to a location of the third non-zero modulation symbol in the third modulation symbol sequence, and the second element sequence is the same as the third element sequence.

With reference to the second aspect and any of the first to the third implementation manner, in a fourth implementation manner of the second aspect, when a receive end device corresponding to a fourth modulation symbol sequence in the L layers of modulation symbol sequences is different from a receive end device corresponding to a fifth modulation symbol sequence in the L layers of modulation symbol sequences, in a fourth precoding matrix corresponding to the fourth modulation symbol sequence, the fourth precoding matrix includes a fourth element sequence in the second dimension, the fourth element sequence corresponds to a fourth non-zero modulation symbol, and the fourth non-zero modulation symbol is a non-zero modulation symbol included in the fourth modulation symbol sequence, and in a fifth precoding matrix corresponding to the fifth modulation symbol sequence, the fifth precoding matrix includes a fifth element sequence in the second dimension, the fifth element sequence corresponds to a fifth non-zero modulation symbol, and the fifth non-zero modulation symbol is a non-zero modulation symbol included in the fifth modulation symbol sequence, where a location of the fourth non-zero modulation symbol in the fourth modulation symbol sequence corresponds to a location of the fifth non-zero modulation symbol in the fifth modulation symbol sequence, and the fourth element sequence is different from the fifth element sequence.

With reference to the second aspect and any of the first to the fourth implementation manner, in a fifth implementation manner of the second aspect, each precoding matrix includes U element sequences in the second dimension, and a location, in the U sequences, of a non-zero element sequence included in each precoding matrix corresponds to a location, in the U modulation symbols, of a non-zero modulation symbol included in a corresponding modulation symbol sequence, and the superposition processing unit is further configured to perform superposition processing on elements that have corresponding locations in the first dimension and corresponding locations in the second dimension and that are in the L layers of modulation symbol sequence matrixes.

With reference to the second aspect and any of the first to the fifth implementation manner, in a sixth implementation manner of the second aspect, a sixth modulation symbol sequence in the L layers of modulation symbol sequences includes V non-zero modulation symbols, V≥1, and in a sixth precoding matrix corresponding to the sixth modulation symbol sequence, the sixth precoding matrix includes V element sequences in a second dimension, and the precoding processing unit is further configured to perform precoding processing on the first modulation symbol sequence according to the first precoding matrix in order to generate a first modulation symbol sequence matrix, where the first modulation symbol sequence matrix includes T element sequences in the first dimension, and the first modulation symbol sequence matrix includes V element sequences in the second dimension.

With reference to the second aspect and any of the first to the sixth implementation manner, in a seventh implementation manner of the second aspect, before performing superposition processing on the L layers of modulation symbol sequence matrixes, the superposition processing unit is further configured to perform zero-fill processing on the sixth modulation symbol sequence matrix according to locations of the V non-zero modulation symbols in the sixth modulation symbol sequence such that a sixth modulation symbol sequence matrix obtained after zero-fill processing includes U element sequences in the second dimension, where locations, in the second dimension, of V non-zero element sequences in the first modulation symbol sequence matrix obtained after zero-fill processing correspond to the locations of the V non-zero modulation symbols in the sixth modulation symbol sequence.

With reference to the second aspect and any of the first to the seventh implementation manner, in an eighth implementation manner of the second aspect, T is a quantity of antenna ports used to transmit the L layers of information bits.

With reference to the second aspect and any of the first to the eighth implementation manner, in a ninth implementation manner of the second aspect, the apparatus is a network device, or the apparatus is a terminal device.

With reference to the second aspect and any of the first to the ninth implementation manner, in a tenth implementation manner of the second aspect, the mapping processing unit is further configured to perform mapping processing using a codeword, where the codeword is a multi-dimensional complex vector used to indicate a mapping relationship between an information bit and at least two modulation symbols, and the at least two modulation symbols include at least one zero modulation symbol and at least one non-zero modulation symbol.

According to a third aspect, a data processing device is provided, where the device includes a bus, a processor connected to the bus, and a memory connected to the bus, where the processor invokes, using the bus, a program stored in the memory in order to perform mapping processing on L layers of information bits in order to generate L layers of modulation symbol sequences, where each layer of modulation symbol sequence includes U modulation symbols, the L layers of modulation symbol sequences correspond to a same time-frequency resource, the U modulation symbols include at least one non-zero modulation symbol and at least one zero modulation symbol, L≥2, and U≥2, perform precoding processing on each layer of modulation symbol sequence according to a precoding matrix that corresponds to each layer of modulation symbol sequence and that is in L precoding matrixes in order to generate L layers of modulation symbol sequence matrixes, where the L precoding matrixes are in a one-to-one correspondence to the L layers of modulation symbol sequences, the precoding matrix includes T element sequences in a first dimension, T is a quantity of space domain resources used to transmit the L layers of information bits, and T≥2, and perform superposition processing on the L layers of modulation symbol sequence matrixes in order to generate a to-be-sent symbol sequence matrix, where the to-be-sent symbol sequence matrix includes T element sequences in the first dimension, and the to-be-sent symbol sequence matrix includes U element sequences in a second dimension.

With reference to the third aspect, in a first implementation manner of the third aspect, when a first modulation symbol sequence in the L layers of modulation symbol sequences includes at least two non-zero modulation symbols, in a first precoding matrix corresponding to the first modulation symbol, the first precoding matrix includes at least two first element sequences in the second dimension, the at least two first element sequences are in a one-to-one correspondence to the at least two non-zero modulation symbols included in the first modulation symbol sequence, and the at least two first element sequences are different.

With reference to the third aspect and the first implementation manner, in a second implementation manner of the third aspect, the precoding matrix is determined according to a receive end device corresponding to each layer of modulation symbol sequence.

With reference to the third aspect and any of the first and second implementation manner, in a third implementation manner of the third aspect, when a receive end device corresponding to a second modulation symbol sequence in the L layers of modulation symbol sequences is the same as a receive end device corresponding to a third modulation symbol sequence in the L layers of modulation symbol sequences, in a second precoding matrix corresponding to the second modulation symbol sequence, the second precoding matrix includes a second element sequence in the second dimension, the second element sequence corresponds to a second non-zero modulation symbol, and the second non-zero modulation symbol is a non-zero modulation symbol included in the second modulation symbol sequence, and in a third precoding matrix corresponding to the third modulation symbol sequence, the third precoding matrix includes a third element sequence in the second dimension, the third element sequence corresponds to a third non-zero modulation symbol, and the third non-zero modulation symbol is a non-zero modulation symbol included in the third modulation symbol sequence, where a location of the second non-zero modulation symbol in the second modulation symbol sequence corresponds to a location of the third non-zero modulation symbol in the third modulation symbol sequence, and the second element sequence is the same as the third element sequence.

With reference to the third aspect and any of the first to the third implementation manner, in a fourth implementation manner of the third aspect, when a receive end device corresponding to a fourth modulation symbol sequence in the L layers of modulation symbol sequences is different from a receive end device corresponding to a fifth modulation symbol sequence in the L layers of modulation symbol sequences, in a fourth precoding matrix corresponding to the fourth modulation symbol sequence, the fourth precoding matrix includes a fourth element sequence in the second dimension, the fourth element sequence corresponds to a fourth non-zero modulation symbol, and the fourth non-zero modulation symbol is a non-zero modulation symbol included in the fourth modulation symbol sequence, and in a fifth precoding matrix corresponding to the fifth modulation symbol sequence, the fifth precoding matrix includes a fifth element sequence in the second dimension, the fifth element sequence corresponds to a fifth non-zero modulation symbol, and the fifth non-zero modulation symbol is a non-zero modulation symbol included in the fifth modulation symbol sequence, where a location of the fourth non-zero modulation symbol in the fourth modulation symbol sequence corresponds to a location of the fifth non-zero modulation symbol in the fifth modulation symbol sequence, and the fourth element sequence is different from the fifth element sequence.

With reference to the third aspect and any of the first to the fourth implementation manner, in a fifth implementation manner of the third aspect, each precoding matrix includes U element sequences in the second dimension, and a location, in the U sequences, of a non-zero element sequence included in each precoding matrix corresponds to a location, in the U modulation symbols, of a non-zero modulation symbol included in a corresponding modulation symbol sequence, and the processor is further configured to perform superposition processing on elements that have corresponding locations in the first dimension and corresponding locations in the second dimension and that are in the L layers of modulation symbol sequence matrixes.

With reference to the third aspect and any of the first to the fifth implementation manner, in a sixth implementation manner of the third aspect, a sixth modulation symbol sequence in the L layers of modulation symbol sequences includes V non-zero modulation symbols, V≥1, and in a sixth precoding matrix corresponding to the sixth modulation symbol sequence, the sixth precoding matrix includes V element sequences in a second dimension, and the processor is further configured to perform precoding processing on the first modulation symbol sequence according to the first precoding matrix in order to generate a first modulation symbol sequence matrix, where the first modulation symbol sequence matrix includes T element sequences in the first dimension, and the first modulation symbol sequence matrix includes V element sequences in the second dimension.

With reference to the third aspect and any of the first to the sixth implementation manner, in a seventh implementation manner of the third aspect, before performing superposition processing on the L layers of modulation symbol sequence matrixes, the processor is further configured to perform zero-fill processing on the sixth modulation symbol sequence matrix according to locations of the V non-zero modulation symbols in the sixth modulation symbol sequence such that a sixth modulation symbol sequence matrix obtained after zero-fill processing includes U element sequences in the second dimension, where locations, in the second dimension, of V non-zero element sequences in the first modulation symbol sequence matrix obtained after zero-fill processing correspond to the locations of the V non-zero modulation symbols in the sixth modulation symbol sequence.

With reference to the third aspect and any of the first to the seventh implementation manner, in an eighth implementation manner of the third aspect, T is a quantity of antenna ports used to transmit the L layers of information bits.

With reference to the third aspect and any of the first to the eighth implementation manner, in a ninth implementation manner of the third aspect, the device is a network device, or the device is a terminal device.

With reference to the third aspect and any of the first to the ninth implementation manner, in a tenth implementation manner of the third aspect, the processor is further configured to perform mapping processing using a codeword, where the codeword is a multi-dimensional complex vector used to indicate a mapping relationship between an information bit and at least two modulation symbols, and the at least two modulation symbols include at least one zero modulation symbol and at least one non-zero modulation symbol.

According to the data processing method, apparatus, and device in the embodiments of the present disclosure, a transmit end device may obtain multiple precoding matrixes respectively corresponding to multiple layers of modulation symbols, perform precoding processing on the corresponding modulation symbols based on the multiple precoding matrixes, to obtain a component of each layer of modulation symbol for each space domain resource, and perform superposition processing on the precoded multiple layers of modulation symbols in order to effectively use a space diversity gain, improve a signal-to-noise ratio of a generated to-be-transmitted signal corresponding to each space domain resource, and reduce a bit error rate when a receive end performs decoding such that communication reliability can be improved significantly.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 2 is a schematic flowchart of a data processing method according to an embodiment of the present disclosure;

FIG. 3 is a schematic diagram of bit mapping processing of SCMA;

DESCRIPTION OF EMBODIMENTS

Figure 1:
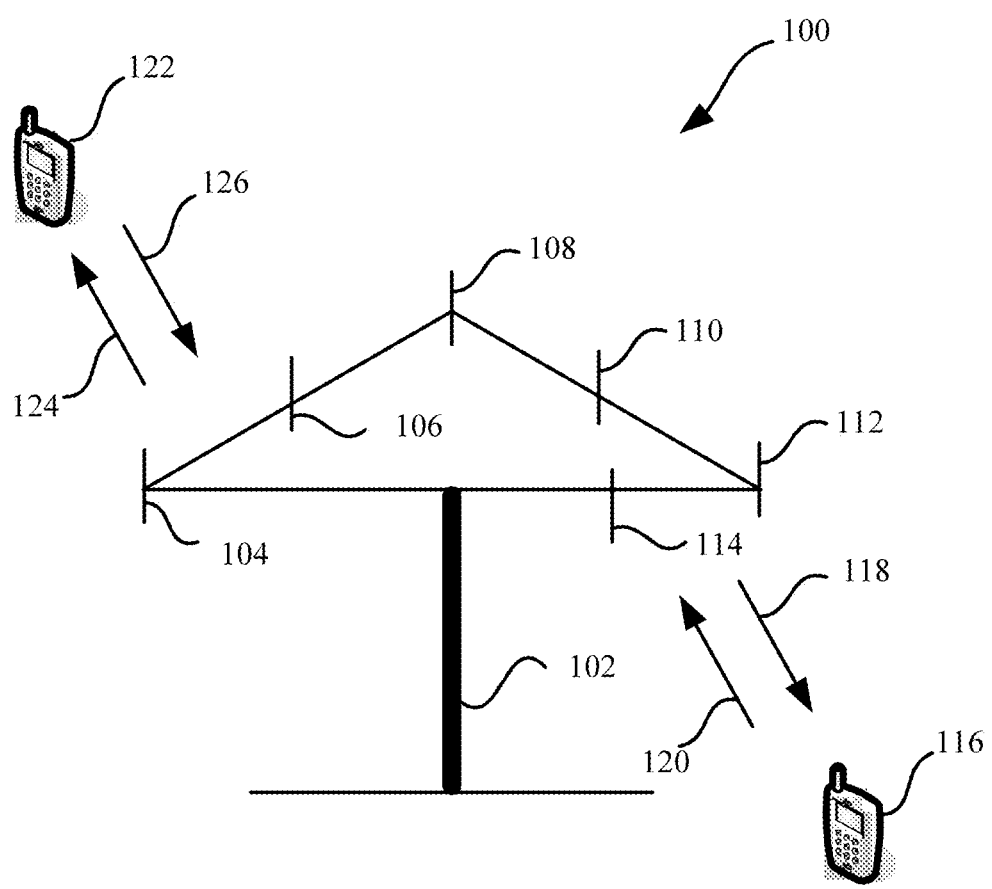
FIG. 1 is a schematic diagram of a communications system to which a data processing method of the present disclosure is applicable.

The following clearly describes the technical solutions in the embodiments of the present disclosure with reference to the accompanying drawings in the embodiments of the present disclosure. The described embodiments are some but not all in the embodiments of the present disclosure. All other embodiments obtained by a person of ordinary skill in the art based on the embodiments of the present disclosure without creative efforts shall fall within the protection scope of the present disclosure.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate using a local and/or remote process and according to, for example, a signal having one or more data packets (for example, data from one component interacting with another component in a local system, a distributed system, and/or across a network such as the Internet interacting with other systems using the signal).

The embodiments are described with reference to a terminal device in the present disclosure. The terminal device may also be referred to as a user equipment (UE), an access terminal, a subscriber unit, a subscriber station, a mobile site, a mobile station, a remote station, a remote terminal, a mobile device, a user terminal, a terminal, a radio communications device, a user agent, or a user apparatus. The access terminal may be a cellular phone, a cordless phone, a Session Initiation Protocol (SIP) phone, a wireless local loop (WLL) station, a Personal Digital Assistant (PDA), a handheld device having a wireless communication function, a computing device, another processing device connected to a wireless modem, an in-vehicle device, a wearable device, or a terminal device in a future fifth generation (5G) network.

In addition, the embodiments are described with reference to a network device in the present disclosure. The network device may be a device, such as a network side device, that is configured to communicate with a mobile device, and the network side device may be a base transceiver station (BTS) in Global System for Mobile communication (GSM) or Code Division Multiple Access (CDMA), a NodeB (NB) in Wideband Code Division Multiple Access (WCDMA), an evolved NodeB (eNB or eNodeB) in Long Term Evolution (LTE), a repeater station, an access point, an in-vehicle device, a wearable device, or a network side device in a future 5G network.

In addition, aspects or features of the present disclosure may be implemented as a method, an apparatus or a product that uses standard programming and/or engineering technologies. The term "product" used in this application covers a computer program that can be accessed from any computer readable component, carrier or medium. For example, the computer-readable medium may include but is not limited to a magnetic storage component (for example, a hard disk, a floppy disk or a magnetic tape), an optical disc (for example, a Compact Disk (CD), a Digital Versatile Disk (DVD), a smart card and a flash memory component (for example, erasable programmable read-only memory (EPROM), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

FIG. 1 is a schematic diagram of a communications system to which a data processing method of the present disclosure is applicable. As shown in FIG. 1, the communications system 100 includes a network side device 102, and the network side device 102 may include multiple antenna groups. Each antenna group may include multiple antennas. For example, one antenna group may include antennas 104 and 106, another antenna group may include antennas 108 and 110, and an additional group may include antennas 112 and 114. In FIG. 1, two antennas are shown in each antenna group, but more or fewer antennas may be used for each group. The network side device 102 may additionally include a transmitter chain and a receiver chain, and a person of ordinary skill in the art may understand that both the transmitter chain and the receiver chain may include multiple components (for example, a processor, a modulator, a multiplexer, a demodulator, a demultiplexer, and an antenna) related to signal sending and receiving.

The network side device 102 may communicate with multiple terminal devices (for example, a terminal device 116 and a terminal device 122). However, it may be understood that the network side device 102 may communicate with any quantity of terminal devices similar to the terminal device 116 or 122. The terminal devices 116 and 122 may be, for example, a cellular phone, a smart phone, a portable computer, a handheld communications device, a handheld computing device, a satellite radio apparatus, a Global Positioning System, a PDA, and/or any other appropriate device configured to perform communication in the wireless communications system 100.

As shown in FIG. 1, the terminal device 116 communicates with the antennas 112 and 114, and the antennas 112 and 114 send information to the terminal device 116 using a forward link 118, and receive information from the terminal device 116 using a reverse link 120. In addition, the terminal device 122 communicates with the antennas 104 and 106, and the antennas 104 and 106 send information to the terminal device 122 using a forward link 124, and receive information from the terminal device 122 using a reverse link 126.

For example, in a frequency division duplex (FDD) system, for example, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a common frequency band, and the forward link 124 and the reverse link 126 may use a common frequency band.

Each group of antennas and/or an area designed for communication is referred to as a sector of the network side device 102. For example, an antenna group may be designed to communicate with a terminal device in a sector of a coverage area of the network side device 102. In a process in which the network side device 102 communicates with the terminal devices 116 and 122 using the forward links 118 and 124 respectively, a transmit antenna of the network side device 102 may improve signal-to-noise ratios of the forward links 118 and 124 by means of beamforming. In addition, compared with a manner in which a network side device sends signals to all terminal devices of the network side device using one single antenna, when the network side device 102 sends, by means of beamforming, signals to the terminal devices 116 and 122 that are randomly dispersed in a related coverage area, a mobile device in a neighboring cell suffers less interference.

In a given time, the network side device 102, the terminal device 116, or the terminal device 122 may be a wireless communications sending apparatus and/or a wireless communications receiving apparatus. When sending data, the wireless communications sending apparatus may encode data for transmission. Further, the wireless communication sending apparatus may obtain (for example, generate, receive from another communication apparatus, or store in a memory) a given quantity of data bits that need to be sent to the wireless communication receiving apparatus through a channel. Such data bits may be included in a transport block (or multiple transport blocks) of data, and the transport block may be segmented to generate multiple code blocks.

FIG. 2 is a schematic flowchart of an information transmission method 200 described from the perspective of a transmit end device according to an embodiment of the present disclosure. As shown in FIG. 2, the method 200 includes the following steps.

Step S210: The transmit end device performs mapping processing on L layers of information bits in order to generate L layers of modulation symbol sequences, where each layer of modulation symbol sequence includes U modulation symbols, the L layers of modulation symbol sequences correspond to a same time-frequency resource, the U modulation symbols include at least one non-zero modulation symbol and at least one zero modulation symbol, L≥2, and U≥2.

Step S220: Perform precoding processing on each layer of modulation symbol sequence according to a precoding matrix that corresponds to each layer of modulation symbol sequence and that is in L precoding matrixes in order to generate L layers of modulation symbol sequence matrixes, where the L precoding matrixes are in a one-to-one correspondence to the L layers of modulation symbol sequences, the precoding matrix includes T element sequences in a first dimension, T is a quantity of space domain resources used to transmit the L layers of information bits, and T≥2.

Step S230: Perform superposition processing on the L layers of modulation symbol sequence matrixes in order to generate a to-be-sent symbol sequence matrix, where the to-be-sent symbol sequence matrix includes T element sequences in the first dimension, and the to-be-sent symbol sequence matrix includes U element sequences in a second dimension.

Optionally, the transmit end device is a network device, or the transmit end device is a terminal device.

In this embodiment of the present disclosure, the transmit end device may be a network device (for example, a network side device), that is, the method 200 may be applied to downlink transmission.

Alternatively, the transmit end device may be a terminal device (for example, user equipment), that is, the method 200 may be applied to uplink transmission.

For ease of understanding and description, the following describes in detail a procedure of the method 200 using a network device as the transmit end device (that is, the data processing method 200 in this embodiment of the present disclosure is performed by the transmit end device).

Further, in step S210, the network device may perform mapping processing on information bits that need to be sent to L terminal devices (marked as a terminal device #1 to a terminal device #L in the following for ease of understanding and description) in order to generate L symbol sequences. It should be noted that, in the communications system 100 in which the data processing method 200 in this embodiment of the present disclosure is used, multiple terminal devices multiplex a same time-frequency resource to perform data transmission with the network device, that is, the L symbol sequences correspond to a same time-frequency resource.

Moreover, the same time-frequency resource, for example, in a time-frequency resource division manner based on a resource element (RE) unit, may be a time-frequency resource block (also referred to as a time-frequency resource group) that includes multiple REs, and the multiple REs may have a same location in a time domain (that is, correspond to a same symbol) and have different locations in a frequency domain (that is, correspond to different subcarriers), or the multiple REs may have different locations in a time domain (that is, correspond to different symbols) and have a same location in a frequency domain (that is, correspond to a same subcarrier). This is not particularly limited in the present disclosure.

Optionally, the mapping processing is mapping processing performed using a codeword. The codeword is a multi-dimensional complex vector used to indicate a mapping relationship between an information bit and at least two modulation symbols, and the at least two modulation symbols include at least one zero modulation symbol and at least one non-zero modulation symbol.

Moreover, optionally, performing, by the transmit end device, mapping processing on the L layers of information bits includes performing, by the transmit end device, mapping processing on the L layers of information bits in an SCMA manner.

Further, SCMA is a non-orthogonal multiple-access technology. Certainly, a person skilled in the art may call the technology another technology other than SCMA. In this technology, multiple different data streams are transmitted on a same transmission resource using codebooks, and different data streams use different codebooks, thereby improving resource utilization. The data streams may be from one terminal device or may be from different terminal devices.

A codebook used in the SCMA is a set of two or more codewords.

A codeword may be a multi-dimensional complex vector. The codeword has two or more dimensions and indicates a mapping relationship between data and two or more modulation symbols. The modulation symbols include at least one zero modulation symbol and at least one non-zero modulation symbol, and the data may be binary-bit data or multi-variate data. Optionally, a relationship between the zero modulation symbol and the non-zero modulation symbol may be that a quantity of zero modulation symbols is not less than a quantity of non-zero modulation symbols.

The codebook includes two or more codewords. The codebook may indicate a mapping relationship between a possible data combination of specific-length data and the codewords in the codebook.

In the SCMA technology, data in a data stream is directly mapped to be a codeword, that is, a multi-dimensional complex vector, in a codebook according to a mapping relationship, to implement extended sending of the data on multiple. Herein, the data may be binary-bit data or may be multi-variate data, and the multiple REs may be REs in a time domain, a frequency domain, a space domain, a time-frequency domain, a time-space domain, or a time-frequency-space domain.

The codeword used in the SCMA may be sparse in some degree. For example, a quantity of zero elements in the codeword may be not less than a quantity of modulation symbols such that a receive end can use a multi-user detection technology to perform decoding with relatively low complexity. Herein, the foregoing listed relationship between the quantity of zero elements and the quantity of modulation symbols is merely an illustrative description for sparsity. The present disclosure is not limited thereto. A ratio of the quantity of zero elements to the quantity of non-zero elements may be randomly set as required.

As an example of the communications system 100, the SCMA system may be listed. In the system 100, multiple users multiplex a same time-frequency resource block for data transmission. Each resource block includes several REs. The REs herein may be subcarrier-symbol units in an OFDM technology or may be time-domain or frequency-domain REs in another air interface technology. For example, in an SCMA system including L terminal devices, an available resource is divided into several orthogonal time-frequency resource blocks, and each resource block includes U REs. The U REs may have a same location in a time domain. When sending data, the terminal device #L first divides to-be-sent data into data blocks of S bits, maps, by searching a codebook (determined and delivered by the network device to the terminal device), each data block to a group of modulation symbol sequence $X\#L=\{X\#L_1, X\#L_2, \ldots, X\#L_U\}$ including U modulation symbols, where each modulation symbol in the sequence corresponds to one RE in a resource block, and then generates a signal waveform according to the modulation symbol. For the data blocks of S bits, each codebook includes 2S different modulation symbol groups that correspond to 2S types of possible data blocks.

The foregoing codebook may also be referred to as an SCMA codebook that is an SCMA codeword set, and an SCMA codeword is a mapping relationship from an information bit to a modulation symbol. That is, the SCMA codebook is a set of the foregoing mapping relationships.

In addition, in SCMA, in a modulation symbol group $X\#k=\{X\#k_1, X\#k_2, \ldots, X\#k_L\}$ corresponding to each terminal device, at least one symbol is a zero symbol, and at least one symbol is a non-zero symbol. That is, for data of one terminal device, in L REs, only some REs (at least one RE) carry the data of the terminal device.

FIG. 3 is a schematic diagram of bit mapping processing (or encoding processing) of SCMA using an example in which six data streams multiplex four REs. As shown in FIG. 3, the six data streams form one group, and the four REs form one encoding unit. One RE may be one subcarrier, one RE, or one antenna port. In FIG. 3, a connection line existing between a data stream and a RE indicates that a non-zero modulation symbol obtained after at least one data combination of the data stream is mapped using a codeword is sent on the RE, no connection line existing between a data stream and a RE indicates that all modulation symbols obtained after all possible data combinations of the data stream are mapped using codewords and sent on the RE are zero modulation symbols. Data combinations of a data stream may be comprehended according to the following description. For example, in a binary-bit data stream, 00, 01, 10, and 11 are all possible 2-bit data combinations. For ease of description, data of each data stream is expressed as $s_1$ to $s_6$, symbols sent on each RE are expressed as $x_1$ to $x_4$, and a connection line between a data stream and a RE indicates that a modulation symbol is sent on the RE after data of the data stream is extended. The modulation symbol may be a zero symbol (corresponding to a zero element) or may be a non-zero symbol (corresponding to a non-zero element). If no connection line exists between a data stream and a RE, it indicates that a modulation symbol is not sent on the RE after data of the data stream is extended.

As can be learned from FIG. 3, data of each data stream is sent on multiple REs after being extended, and a symbol sent on each RE is a superposition of non-zero symbols obtained after extending data from multiple data streams. For example, non-zero symbols are sent on a RE 1 and a RE 2 after data $s_3$ of a data stream 3 is extended, and data $x_2$ sent on a RE 3 is a superposition of non-zero symbols that are obtained after data $s_2$, data $s_4$, and data $s_6$ of a data stream 2, a data stream 4, and a data stream 6 are extended. A quantity of data streams may be greater than a quantity of REs. Therefore, the SCMA system can effectively improve a network capacity, including a quantity of users that can access the system and spectral efficiency.

A codeword in a codebook generally has the following form:

$$\begin{pmatrix} c_{1,q} \\ c_{2,q} \\ \vdots \\ c_{N,q} \end{pmatrix}$$

The corresponding codebook generally has the following form:

$$\left\{ \begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \ldots, \begin{pmatrix} c_{1,Q_m} \\ c_{2,Q_m} \\ \vdots \\ c_{N,Q_m} \end{pmatrix} \right\},$$

where N is a positive integer greater than 1, and may represent a quantity of REs included in an encoding unit, or may be understood as a length of a codeword, $Q_m$ is a positive integer greater than 1, represents a quantity of codewords included in a codebook, and corresponds to a modulation order, and for example, $Q_m$ is 4 when quadrature phase shift keying (QPSK) or 4-order modulation is used, q is a positive integer, and $1 \leq q \leq Q_m$, and an element $c_{n,q}$ included in a codebook and a codeword is a complex, and mathematically, $c_{n,q}$ may be expressed as:

$$c_{n,q} \in \{0, \alpha^* \exp(j^* \beta)\}, 1 \leq n \leq N, 1 \leq q \leq Q_m,$$

where $\alpha$ may be any real number, $\beta$ may be any value, and N and $Q_m$ may be positive integers.

Moreover, a mapping relationship may be formed between the codewords in the codebook and data. For example, a mapping relationship may be formed between the codewords in the codebook and 2-bit data.

For example, "00" may correspond to a codeword 1, that is, $$\begin{pmatrix} c_{1,1} \\ c_{2,1} \\ \vdots \\ c_{N,1} \end{pmatrix},$$

"01" may correspond to a codeword 2, that is, $$\begin{pmatrix} c_{1,2} \\ c_{2,2} \\ \vdots \\ c_{N,2} \end{pmatrix},$$

"10" may correspond to a codeword 3, that is, $$\begin{pmatrix} c_{1,3} \\ c_{2,3} \\ \vdots \\ c_{N,3} \end{pmatrix},$$

and

"11" may correspond to a codeword 4, that is, $$\begin{pmatrix} c_{1,4} \\ c_{2,4} \\ \vdots \\ c_{N,4} \end{pmatrix}.$$

With reference to FIG. 3, when a connection line exists between a data stream and a RE, a codebook corresponding to the data stream and codewords in the codebook should have the following characteristics. For at least one codeword in the codebook, a non-zero modulation symbol is sent on the corresponding RE. For example, when a connection line exists between the data stream 3 and the RE 1, at least one codeword in a codebook corresponding to the data stream 3 meets $c_{1,q} \neq 0$, where $1 \leq q \leq Q_m$.

When no connection line exists between a data stream and a RE, a codebook corresponding to the data stream and codewords in the codebook should have the following characteristics. For all codewords in the codebook, a zero modulation symbol is sent on the corresponding RE. For example, when no connection line exists between the data stream 3 and the RE 3, any codeword in a codebook corresponding to the data stream 3 meets $c_{3,q}=0$, where $1 \leq q \leq Q_m$.

In conclusion, when a modulation order is QPSK, the codebook corresponding to the data stream 3 in FIG. 3 may have the following form and characteristics:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\},$$

where $c_{n,q} = \alpha^* \exp(j^* \beta), 1 \leq n \leq 2, 1 \leq q \leq 4$, $\alpha$ and $\beta$ may be any real number, for any q, $1 \leq q \leq 4$, and one of $c_{1,q}$ or $c_{2,q}$ is not zero if the other is zero, or neither $c_{1,q}$ nor $c_{2,q}$ is zero, and there is at least one group of $q_1$ and $q_2$, $1 \leq q_1$ and $q_2 \leq 4$, to make $c_{1,q_1} \neq 0$ and $c_{2,q_2} \neq 0$.

For example, if the data $s_3$ of the data stream 3 is "10", according to the foregoing mapping rule, the data combination is mapped to be a codeword, that is, a 4-dimensional complex vector:

$$\begin{pmatrix} c_{1,3} \\ c_{2,3} \\ 0 \\ 0 \end{pmatrix}.$$

It should be understood that the SCMA system discussed above is only an example of a communications system to which the data transmission method and apparatus of the present disclosure are applicable. The present disclosure is not limited thereto. Any other communications system that can enable a terminal device to multiplex a same time-frequency resource within a same period of time to perform data transmission falls within the protection scope of the present disclosure.

For ease of understanding and description, in the following embodiments, unless otherwise noted, an application in the SCMA system is used as an example to describe the data processing method in this embodiment of the present disclosure.

In addition, in this embodiment of the present disclosure, the foregoing mapping processing process may be similar to a mapping processing process in an existing SCMA system. Herein, in order to avoid repetition, detailed descriptions are omitted. Because of a sparsity requirement on a codebook in the SCMA system, modulation symbol sequences that correspond to terminal devices and that are generated in the mapping processing in step S210 include U symbols (corresponding to U REs) in total, and V symbols are non-zero symbols.

In step S220, the network device may determine precoding matrixes respectively corresponding to the symbols.

The precoding matrix may also be referred to as a precoding codeword, and is used to indicate a mapping relationship between a control bit and a precoding vector.

First, a quantity of elements included in the precoding matrix in each dimension is described.

In this embodiment of the present disclosure, dimensions of a matrix include rows and columns, that is, the first dimension may be a row direction of the matrix, and the second dimension may be a column direction of the matrix, or the first dimension may be a column direction of the matrix, and the second dimension may be a row direction of the matrix. This is not particularly limited in the present disclosure.

In this embodiment of the present disclosure, one dimension (that is, an example of the first dimension) in each precoding matrix includes a same quantity of elements, and the quantity is T. For ease of understanding, the following provides descriptions using an example in which a row direction is used as the first dimension, that is, each precoding matrix includes T rows. T is a quantity of space domain resources used when the network device sends the L modulation symbol sequences.

Optionally, T is a quantity of antenna ports used to transmit the L layers of information bits.

Further, T may be a quantity of antenna ports used when the network device sends the L modulation symbol sequences, or T may be a quantity of antennas used when the network device receives the L modulation symbol sequences.

For another dimension (that is, an example of the second dimension), for ease of understanding, the following provides descriptions using an example in which a column direction is used as the second dimension. The dimension may include a same quantity of elements (that is, Case 1), or different quantities of elements (that is, Case 2). This is not particularly limited in the present disclosure. The following separately describes the foregoing two cases in detail.

Case 1:

Optionally, each precoding matrix includes U element sequences in the second dimension, and a location, in the U sequences, of a non-zero element sequence included in each precoding matrix corresponds to a location, in the U modulation symbols, of a non-zero modulation symbol included in a corresponding modulation symbol sequence.

Further, in this embodiment of the present disclosure, scales of precoding matrixes may be the same, that is, each row in each precoding matrix includes a same quantity of elements, and each column includes a same quantity of elements.

As described above, in this embodiment of the present disclosure, each precoding matrix includes T rows, that is, each column in each precoding matrix includes T elements.

Moreover, in this embodiment of the present disclosure, each precoding matrix includes U columns (that is, U element sequences), that is, each row in each precoding matrix includes U elements.

Without loss of generality, one modulation symbol sequence of the L layers of modulation symbol sequences is recorded as a modulation symbol sequence #7, and a precoding matrix #7 corresponding to the modulation symbol sequence #7 is used as an example. U columns of elements (that is, U element sequences) included in the precoding matrix #7 include V non-zero columns (that is, non-zero element sequences). Moreover, each column in the V non-zero columns includes at least one non-zero element. Locations (for example, sequence numbers) of V non-zero columns in the precoding matrix #7 are the same as locations (for example, sequence numbers) of non-zero modulation symbols in the modulation symbol sequence #7.

It should be understood that, the foregoing listed manner in which locations are the same is merely an example of corresponding locations, and the present disclosure is not limited thereto. For example, a relation between a location of a non-zero column in a precoding matrix and a location of a non-zero modulation symbol in a modulation symbol sequence may be generated, and a precoding matrix corresponding to each modulation symbol sequence is determined according to the relation.

Then, a precoding processing process and a superposition processing process that corresponds to Case 1 are described.

Case 2:

Optionally, a sixth modulation symbol sequence in the L layers of modulation symbol sequences includes V non-zero modulation symbols, $V \geq 1$, and in a sixth precoding matrix corresponding to the sixth modulation symbol sequence, the sixth precoding matrix includes V element sequences in a second dimension.

The performing precoding processing on each layer of modulation symbol sequence according to a precoding matrix corresponding to each layer of modulation symbol sequence includes performing precoding processing on the first modulation symbol sequence according to the first precoding matrix in order to generate a first modulation symbol sequence matrix, where the first modulation symbol sequence matrix includes T element sequences in the first dimension, and the first modulation symbol sequence matrix includes V element sequences in the second dimension.

Further, in this embodiment of the present disclosure, scales of precoding matrixes may be the same, that is, each row in each precoding matrix includes a same quantity of elements, and each column includes a same quantity of elements.

As described above, in this embodiment of the present disclosure, each precoding matrix includes T rows, that is, each column in each precoding matrix includes T elements.

Moreover, in this embodiment of the present disclosure, quantities of columns included in precoding matrixes may be different.

Without loss of generality, one modulation symbol sequence of the L layers of modulation symbol sequences is recorded as a modulation symbol sequence #6, and a precoding matrix #6 corresponding to the modulation symbol sequence #6 (that is, an example of the sixth modulation symbol sequence) is used as an example. A quantity of columns included in the precoding matrix #6 is the same as a quantity of non-zero elements included in the modulation symbol sequence #6, that is, the precoding matrix #6 includes V columns of elements (that is, V element sequences).

It should be understood that, in this embodiment of the present disclosure, the sixth modulation symbol sequence may be one layer of modulation symbol sequence in the L layers of modulation symbol sequences, or may be multiple layers of modulation symbol sequences in the L layers of modulation symbol sequences. This is not particularly limited in the present disclosure. Moreover, when the sixth modulation symbol sequence is multiple layers of modulation symbol sequences in the L layers of modulation symbol sequences, processing for each layer of modulation symbol sequence is similar to processing for the modulation symbol sequence #6. To avoid repetition, descriptions for a same or similar case are omitted.

Then, a precoding processing process and a superposition processing process that corresponds to Case 2 are described.

The foregoing describes the scale (that is, a row quantity and a column quantity) of the precoding matrix determined according to the method 200 in this embodiment of the present disclosure.

The following describes a method for determining an element in a non-zero column (that is, a column including at least one non-zero element) in a precoding matrix.

Optionally, when a first modulation symbol sequence in the L layers of modulation symbol sequences includes at least two non-zero modulation symbols, in a first precoding matrix corresponding to the first modulation symbol, the first precoding matrix includes at least two first element sequences in the second dimension, the at least two first element sequences are in a one-to-one correspondence to the at least two non-zero modulation symbols included in the first modulation symbol sequence, and the at least two first element sequences are different.

Further, if one modulation symbol sequence includes two or more non-zero elements, two or more columns that correspond to the two or more non-zero elements and that are in a precoding matrix corresponding to the modulation symbol sequence may be different from each other.

For example, without loss of generality, one modulation symbol sequence in the L layers of modulation symbol sequences is recorded as a modulation symbol sequence #1, and a precoding matrix #1 (that is, an example of the first precoding matrix) corresponding to the modulation symbol sequence #1 (that is, an example of the first modulation symbol sequence) is used as an example.

When the modulation symbol sequence #1 includes two or more non-zero modulation symbols, a quantity of non-zero columns (that is, an example of the first element sequence) included in the precoding matrix #1 is the same as a quantity of non-zero elements included in the modulation symbol sequence #1, and the non-zero columns are different from each other. Herein, the non-zero columns being different from each other may be implemented in the following manner pairing N non-zero columns in order to generate $C_N^2$ non-zero column pairs, where in every two non-zero column pairs at least one non-zero column in one non-zero column pair is different from any non-zero column in the other non-zero column pair.

Moreover, in two non-zero columns included in any non-zero column pair, elements on at least one same location (that is, locations with a same sequence number in columns) are different from each other.

According to the data processing method in this embodiment of the present disclosure, non-zero elements in a same modulation symbol sequence need to be sent to a same receive end device. Therefore, element sequences in precoding matrixes corresponding to non-zero elements in a same modulation symbol sequence are different from each other such that the non-zero elements correspond to different sub-channels, to reduce interference between non-zero elements, thereby further reducing a bit error rate when a receive end performs decoding, and improving communication reliability.

Optionally, the precoding matrix is determined according to a receive end device corresponding to each layer of modulation symbol sequence.

In this embodiment of the present disclosure, any two modulation symbol sequences may correspond to a same receive end device (that is, Case A) or different receive end devices (that is, Case B). The following separately describes processing in the foregoing two cases in detail.

Case A:

Optionally, when a receive end device corresponding to a second modulation symbol sequence in the L layers of modulation symbol sequences is the same as a receive end device corresponding to a third modulation symbol sequence in the L layers of modulation symbol sequences, in a second precoding matrix corresponding to the second modulation symbol sequence, the second precoding matrix includes a second element sequence in the second dimension, the second element sequence corresponds to a second non-zero modulation symbol, and the second non-zero modulation symbol is a non-zero modulation symbol included in the second modulation symbol sequence, and in a third precoding matrix corresponding to the third modulation symbol sequence, the third precoding matrix includes a third element sequence in the second dimension, the third element sequence corresponds to a third non-zero modulation symbol, and the third non-zero modulation symbol is a non-zero modulation symbol included in the third modulation symbol sequence, where a location of the second non-zero modulation symbol in the second modulation symbol sequence corresponds to a location of the third non-zero modulation symbol in the third modulation symbol sequence, and the second element sequence is the same as the third element sequence.

Further, if two modulation symbol sequences correspond to a same receive end device, two corresponding columns of elements in precoding matrixes corresponding to the two modulation symbol sequences may be the same.

For example, without loss of generality, one modulation symbol sequence in the L layers of modulation symbol sequences is recorded as a modulation symbol sequence #2, and a precoding matrix #2 (that is, an example of the second modulation symbol sequence) corresponding to the modulation symbol sequence #2 (that is, an example of the second precoding matrix) is used as an example. Moreover, another modulation symbol sequence in the L layers of modulation symbol sequences is recorded as a modulation symbol sequence #3, and a precoding matrix #3 (that is, an example of the third precoding matrix) corresponding to the modulation symbol sequence #3 (that is, an example of the third modulation symbol sequence) is used as an example.

Assuming that the modulation symbol sequence #2 includes A non-zero modulation symbols, as described above, a quantity of non-zero columns (that is, an example of the second element sequence) included in the precoding matrix #2 is the same as a quantity of non-zero elements included in the modulation symbol sequence #2, and the non-zero columns are different from each other. The non-zero columns included in the precoding matrix #2 are recorded as a non-zero column $\#2_1$ to a non-zero column $\#2_A$.

Assuming that the modulation symbol sequence #3 includes B non-zero modulation symbols, as described above, a quantity of non-zero columns (that is, an example of the third element sequence) included in the precoding matrix #3 is the same as a quantity of non-zero elements included in the modulation symbol sequence #3, and the non-zero columns are different from each other. The non-zero columns included in the precoding matrix #3 are recorded as a non-zero column $\#3_1$ to a non-zero column $\#3_B$.

When A≤B, the non-zero column $\#2_1$ may be the same as the non-zero column $\#3_1$, the non-zero column $\#2_2$ may be the same as the non-zero column $\#3_2$, and so on, till the non-zero column $\#2_A$ is the same as the non-zero column $\#3_A$.

Herein, it should be noted that, two columns (that is, two element sequences) being the same may refer to that elements at each location in the two columns are the same.

According to the data processing method in this embodiment of the present disclosure, when two modulation symbol sequences need to be sent to a same receive end device, non-zero elements at corresponding (for example, same) locations in the two modulation symbol sequences correspond to a same element sequence in precoding matrixes such that data can be sent to the same receive end device using a same channel, and communication reliability can be further improved.

Case B:

Optionally, when a receive end device corresponding to a fourth modulation symbol sequence in the L layers of modulation symbol sequences is different from a receive end device corresponding to a fifth modulation symbol sequence in the L layers of modulation symbol sequences, in a fourth precoding matrix corresponding to the fourth modulation symbol sequence, the fourth precoding matrix includes a fourth element sequence in the second dimension, the fourth element sequence corresponds to a fourth non-zero modulation symbol, and the fourth non-zero modulation symbol is a non-zero modulation symbol included in the fourth modulation symbol sequence, and in a fifth precoding matrix corresponding to the fifth modulation symbol sequence, the fifth precoding matrix includes a fifth element sequence in the second dimension, the fifth element sequence corresponds to a fifth non-zero modulation symbol, and the fifth non-zero modulation symbol is a non-zero modulation symbol included in the fifth modulation symbol sequence, where a location of the fourth non-zero modulation symbol in the fourth modulation symbol sequence corresponds to a location of the fifth non-zero modulation symbol in the fifth modulation symbol sequence, and the fourth element sequence is different from the fifth element sequence.

Further, if two modulation symbol sequences correspond to different receive end devices, two corresponding columns of elements in precoding matrixes may correspond to the two different modulation symbol sequences.

For example, without loss of generality, one modulation symbol sequence in the L layers of modulation symbol sequences is recorded as a modulation symbol sequence #4, and a precoding matrix #4 (that is, an example of the fourth modulation symbol sequence) corresponding to the modulation symbol sequence #4 (that is, an example of the fourth precoding matrix) is used as an example. Moreover, another modulation symbol sequence in the L layers of modulation symbol sequences is recorded as a modulation symbol sequence #5, and a precoding matrix #5 (that is, an example of the fifth modulation symbol sequence) corresponding to the modulation symbol sequence #5 (that is, an example of the fifth precoding matrix) is used as an example.

Assuming that the modulation symbol sequence #4 includes C non-zero modulation symbols, as described above, a quantity of non-zero columns (that is, an example of the fourth element sequence) included in the precoding matrix #4 is the same as a quantity of non-zero elements included in the modulation symbol sequence #4, and the non-zero columns are different from each other. The non-zero columns included in the precoding matrix #4 are recorded as a non-zero column $\#4_1$ to a non-zero column $\#4_C$.

Assuming that the modulation symbol sequence #5 includes D non-zero modulation symbols, as described above, a quantity of non-zero columns (that is, an example of the fifth element sequence) included in the precoding matrix #5 is the same as a quantity of non-zero elements included in the modulation symbol sequence #5, and the non-zero columns are different from each other. The non-zero columns included in the precoding matrix #5 are recorded as a non-zero column $\#5_1$ to a non-zero column $\#5_D$.

When C≤D, the non-zero column $\#4_1$ may be different from the non-zero column $\#5_1$, the non-zero column $\#4_2$ may be different from the non-zero column $\#5_2$, and so on, till the non-zero column $\#4_C$ is different from the non-zero column $\#5_C$.

Herein, it should be noted that, two columns (that is, two element sequences) being different may refer to that elements on at least one location in the two columns are different.

According to the data processing method in this embodiment of the present disclosure, when two modulation symbol sequences need to be sent to different receive end devices, non-zero elements at corresponding (for example, same) locations in the two modulation symbol sequences correspond to different element sequences in precoding matrixes such that data can be sent to different receive end devices using different channels, and interference between data of the different receive end devices can be reduced, thereby further reducing a bit error rate when receive ends perform decoding, and further improving communication reliability.

After determining a precoding matrix corresponding to each modulation symbol sequence as described above, the network device may perform precoding processing on each modulation symbol sequence.

Further, for example, it is assumed that after SCMA encoding, the L layers of information bits are separately mapped to a modulation symbol sequence $x^l$, where $l=1, \ldots, L$.

Using precoding processing on $x^l$ as an example, non-zero symbols in $x^l$ are used as diagonal elements to form a diagonal matrix $\tilde{x}^l$. Therefore, a modulation symbol sequence matrix $y^l$ corresponding to $x^l$ may be obtained by precoding $x^l$ according to the following Formula 1:

$$y^l = W^l \tilde{x}^l = \begin{bmatrix} w^l_{11} & \ldots & w^l_{1V} \\ \vdots & \ddots & \vdots \\ w^l_{T1} & \ldots & w^l_{TV} \end{bmatrix} \begin{bmatrix} \tilde{x}^l_1 & \ldots & 0 \\ \vdots & \ddots & \vdots \\ 0 & \ldots & \tilde{x}^l_V \end{bmatrix}, \quad \text{Formula 1}$$

where $W^l$ is a matrix including T rows and V columns, and when a solution in Case A or Case B is met, the method for determining elements in the matrix may be similar to that in the other approaches. Herein, to avoid repetition, detailed descriptions are omitted.

In step S230, the network device may perform superposition processing on the foregoing generated modulation symbol sequence matrixes.

In this embodiment of the present disclosure, the network device may perform the superposition processing according to a location of a non-zero modulation symbol in each layer of modulation symbol sequence.

For example, the network device may superpose columns that are in respective modulation symbol sequence matrixes and that correspond to a same RE in order to obtain a to-be-sent symbol sequence corresponding to each RE.

For example, optionally, determining L precoding matrixes includes determining L precoding matrixes, where each precoding matrix includes U element sequences in the second dimension, and a location, in the U sequences, of a non-zero element sequence included in each precoding matrix corresponds to a location, in the U modulation symbols, of a non-zero modulation symbol included in a corresponding modulation symbol sequence, and performing superposition processing on the L layers of modulation symbol sequence matrixes includes performing superposition processing on elements that have corresponding locations in the first dimension and corresponding locations in the second dimension and that are in the L layers of modulation symbol sequence matrixes.

Further, in Case 1, the scales of the determined precoding matrixes are the same, that is, both the row quantities and the column quantities are the same. Therefore, scales of L modulation symbol sequence matrixes obtained after precoding processing are also the same, that is, both the row quantities and the column quantities are the same. In this case, in the L modulation symbol sequence matrixes, elements at a same location (that is, at a same row location and a same column location) may be superposed in order to generate a to-be-sent symbol sequence matrix.

For another example, optionally, before performing superposition processing on the L layers of modulation symbol sequence matrixes, the method further includes performing zero-fill processing on the sixth modulation symbol sequence matrix according to locations of the V non-zero modulation symbols in the sixth modulation symbol sequence such that a sixth modulation symbol sequence matrix obtained after zero-fill processing includes U element sequences in the second dimension, where locations, in the second dimension, of V non-zero element sequences in the first modulation symbol sequence matrix obtained after zero-fill processing correspond to the locations of the V non-zero modulation symbols in the sixth modulation symbol sequence.

Further, in Case 2, the scales of the determined precoding matrixes are different, that is, row quantities or column quantities are different. Therefore, scales of L modulation symbol sequence matrixes obtained after precoding processing are also different, that is, both row quantities and column quantities are different.

Without loss of generality, one modulation symbol sequence in the L layers of modulation symbol sequences is recorded as a modulation symbol sequence #6, and a precoding matrix #6 (that is, an example of the sixth precoding matrix) corresponding to the modulation symbol sequence #6 (that is, an example of the sixth modulation symbol sequence) is used as an example. A quantity of columns included in the precoding matrix #6 is the same as a quantity of non-zero elements included in the modulation symbol sequence #6, that is, the precoding matrix #6 includes V columns of elements (that is, V element sequences), and a modulation symbol sequence matrix #6 generated according to Formula 1 includes T rows and V columns (that is, V non-zero element sequences). In this case, the V columns correspond to V non-zero elements in the modulation symbol sequence #6, locations of the V non-zero element sequences in the precoding matrix #6 may correspond to locations of the V non-zero elements in the modulation symbol sequence #6, and other locations are filled with zero sequences such that the modulation symbol sequence matrix #6 can be converted into a matrix including T rows and U columns. Similarly, each modulation symbol sequence matrix may be converted into a matrix including T rows and U columns such that elements that are on a same location (that is, a same row location and a same column location) and that are in the L converted modulation symbol sequence matrixes may be superposed in order to generate a to-be-sent symbol sequence matrix.

Figure 4:
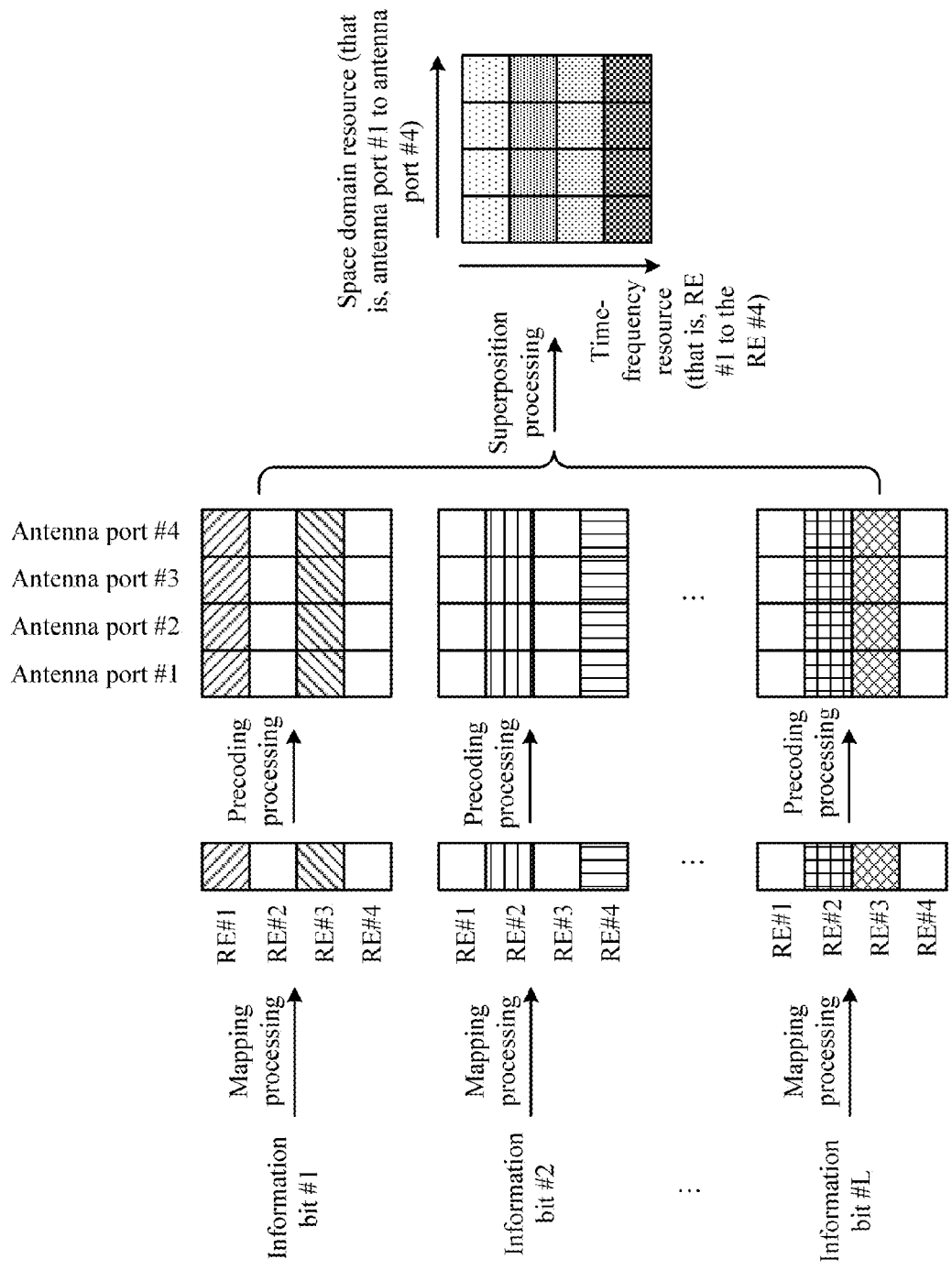
FIG. 4 is a schematic flowchart of a data processing method according to an embodiment of the present disclosure.

FIG. 4 is a schematic flowchart of applying the method 200 in this embodiment of the present disclosure to an SCMA system. As shown in FIG. 4, after mapping processing is performed, according to the method described in step S210, on information bits (that is, an information bit #1 to an information bit #L) corresponding to a terminal device #1 to a terminal device #L, modulation symbol sequences X#1 to X#L respectively corresponding to the terminal device #1 to the terminal device #L may be generated, and the modulation symbol sequences are sparsely mapped to a resource block formed by an RE #1 to an RE #4. After precoding processing described in step S220 is performed (implemented based on the L precoding matrixes generated in step S220), a modulation symbol sequence matrix corresponding to each terminal device is generated, and the modulation symbol sequence matrix may correspond to a two-dimensional resource matrix formed by the space domain resource (that is, an antenna port #1 to an antenna port #4) and a time-frequency resource (that is, the RE #1 to the RE #4). After the superposition processing described in step S230 is performed, a to-be-sent symbol sequence matrix is generated.

It should be noted that, in the terminal device #1 to terminal device #L, any two terminal devices may be a same terminal device or may be different terminal devices, and this is not particularly limited in the present disclosure. For example, when the terminal device #1 and the terminal device #L are a same terminal device, it indicates that the information bit #1 and the information bit #L need to be sent to the same terminal device, and when the terminal device #1 and the terminal device #L are different terminal devices, it indicates that the information bit #1 and the information bit #L need to be sent to different terminal devices.

Moreover, the quantity of the space domain resources and the quantity of time-frequency resources described above are merely an example for description. The present disclosure is not limited thereto.

In addition, in this embodiment of the present disclosure, the precoding matrix is determined according to a corresponding modulation symbol sequence (for example, a receive end device of the modulation symbol sequence and a quantity of included non-zero symbols). Therefore, any two precoding matrixes in the L precoding matrixes may be the same or may be different. This is not particularly limited in the present disclosure.

According to the data processing method in this embodiment of the present disclosure, a transmit end device may obtain multiple precoding matrixes respectively corresponding to multiple layers of modulation symbols, perform precoding processing on the corresponding modulation symbols based on the multiple precoding matrixes in order to obtain a component of each layer of modulation symbol for each space domain resource, and perform superposition processing on the precoded multiple layers of modulation symbols in order to effectively use a space diversity gain, improve a signal-to-noise ratio of a generated to-be-transmitted signal corresponding to each space domain resource, and reduce a bit error rate when a receive end performs decoding such that communication reliability can be improved significantly.

Figure 5:
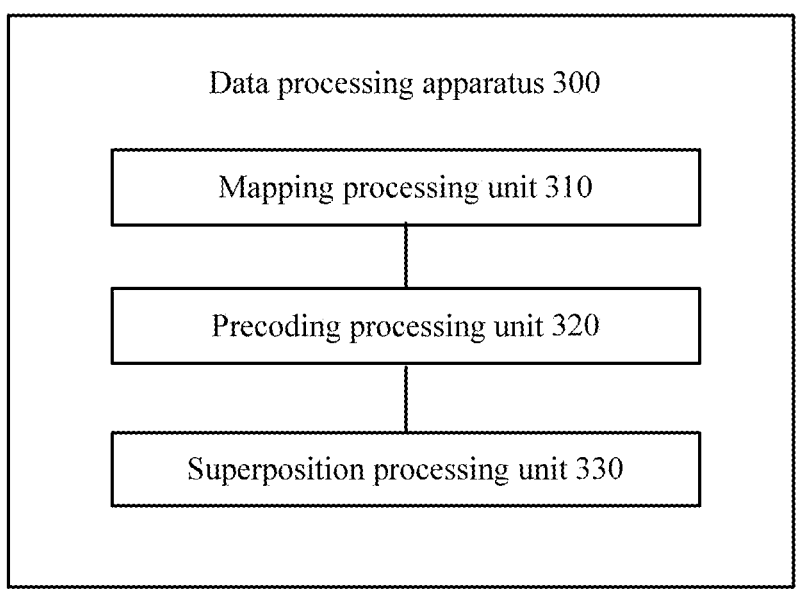
FIG. 5 is a schematic structural diagram of a data processing apparatus according to an embodiment of the present disclosure.

The foregoing describes in detail a data processing method according to the embodiments of the present disclosure with reference to FIG. 1 to FIG. 4, and the following describes in detail a data processing apparatus according to the embodiments of the present disclosure with reference to FIG. 5.

FIG. 5 is a schematic block diagram of a data processing apparatus 300 according to an embodiment of the present disclosure. As shown in FIG. 5, the data processing apparatus 300 includes a mapping processing unit 310 configured to perform mapping processing on L layers of information bits in order to generate L layers of modulation symbol sequences, where each layer of modulation symbol sequence includes U modulation symbols, the L layers of modulation symbol sequences correspond to a same time-frequency resource, the U modulation symbols include at least one non-zero modulation symbol and at least one zero modulation symbol, L≥2, and U≥2, a precoding processing unit 320 configured to perform precoding processing on each layer of modulation symbol sequence according to a precoding matrix that corresponds to each layer of modulation symbol sequence and that is in L precoding matrixes in order to generate L layers of modulation symbol sequence matrixes, where the L precoding matrixes are in a one-to-one correspondence to the L layers of modulation symbol sequences, the precoding matrix includes T element sequences in a first dimension, T is a quantity of space domain resources used to transmit the L layers of information bits, and T≥2, and a superposition processing unit 330 configured to perform superposition processing on the L layers of modulation symbol sequence matrixes in order to generate a to-be-sent symbol sequence matrix, where the to-be-sent symbol sequence matrix includes T element sequences in the first dimension, and the to-be-sent symbol sequence matrix includes U element sequences in a second dimension.

Optionally, when a first modulation symbol sequence in the L layers of modulation symbol sequences includes at least two non-zero modulation symbols, in a first precoding matrix corresponding to the first modulation symbol, the first precoding matrix includes at least two first element sequences in the second dimension, the at least two first element sequences are in a one-to-one correspondence to the at least two non-zero modulation symbols included in the first modulation symbol sequence, and the at least two first element sequences are different.

Optionally, the precoding matrix is determined according to a receive end device corresponding to each layer of modulation symbol sequence.

Optionally, when a receive end device corresponding to a second modulation symbol sequence in the L layers of modulation symbol sequences is the same as a receive end device corresponding to a third modulation symbol sequence in the L layers of modulation symbol sequences, in a second precoding matrix corresponding to the second modulation symbol sequence, the second precoding matrix includes a second element sequence in the second dimension, the second element sequence corresponds to a second non-zero modulation symbol, and the second non-zero modulation symbol is a non-zero modulation symbol included in the second modulation symbol sequence, and in a third precoding matrix corresponding to the third modulation symbol sequence, the third precoding matrix includes a third element sequence in the second dimension, the third element sequence corresponds to a third non-zero modulation symbol, and the third non-zero modulation symbol is a non-zero modulation symbol included in the third modulation symbol sequence, where a location of the second non-zero modulation symbol in the second modulation symbol sequence corresponds to a location of the third non-zero modulation symbol in the third modulation symbol sequence, and the second element sequence is the same as the third element sequence.

Optionally, when a receive end device corresponding to a fourth modulation symbol sequence in the L layers of modulation symbol sequences is different from a receive end device corresponding to a fifth modulation symbol sequence in the L layers of modulation symbol sequences, in a fourth precoding matrix corresponding to the fourth modulation symbol sequence, the fourth precoding matrix includes a fourth element sequence in the second dimension, the fourth element sequence corresponds to a fourth non-zero modulation symbol, and the fourth non-zero modulation symbol is a non-zero modulation symbol included in the fourth modulation symbol sequence, and in a fifth precoding matrix corresponding to the fifth modulation symbol sequence, the fifth precoding matrix includes a fifth element sequence in the second dimension, the fifth element sequence corresponds to a fifth non-zero modulation symbol, and the fifth non-zero modulation symbol is a non-zero modulation symbol included in the fifth modulation symbol sequence, where a location of the fourth non-zero modulation symbol in the fourth modulation symbol sequence corresponds to a location of the fifth non-zero modulation symbol in the fifth modulation symbol sequence, and the fourth element sequence is different from the fifth element sequence.

Optionally, each precoding matrix includes U element sequences in the second dimension, and a location, in the U sequences, of a non-zero element sequence included in each precoding matrix corresponds to a location, in the U modulation symbols, of a non-zero modulation symbol included in a corresponding modulation symbol sequence, and the superposition processing unit 330 is further configured to perform superposition processing on elements that have corresponding locations in the first dimension and corresponding locations in the second dimension and that are in the L layers of modulation symbol sequence matrixes.

Optionally, a sixth modulation symbol sequence in the L layers of modulation symbol sequences includes V non-zero modulation symbols, V≥1, and in a sixth precoding matrix corresponding to the sixth modulation symbol sequence, the sixth precoding matrix includes V element sequences in a second dimension, and the precoding processing unit 320 is further configured to perform precoding processing on the first modulation symbol sequence according to the first precoding matrix in order to generate a first modulation symbol sequence matrix, where the first modulation symbol sequence matrix includes T element sequences in the first dimension, and the first modulation symbol sequence matrix includes V element sequences in the second dimension.

Optionally, before performing superposition processing on the L layers of modulation symbol sequence matrixes, the superposition processing unit 330 is further configured to perform zero-fill processing on the sixth modulation symbol sequence matrix according to locations of the V non-zero modulation symbols in the sixth modulation symbol sequence such that a sixth modulation symbol sequence matrix obtained after zero-fill processing includes U element sequences in the second dimension, where locations, in the second dimension, of V non-zero element sequences in the first modulation symbol sequence matrix obtained after zero-fill processing correspond to the locations of the V non-zero modulation symbols in the sixth modulation symbol sequence.

Optionally, T is a quantity of antenna ports used to transmit the L layers of information bits.

Optionally, the apparatus is a network device, or the apparatus is a terminal device.

Optionally, the mapping processing unit 310 is further configured to perform mapping processing using a codeword, where the codeword is a multi-dimensional complex vector used to indicate a mapping relationship between an information bit and at least two modulation symbols, and the at least two modulation symbols include at least one zero modulation symbol and at least one non-zero modulation symbol.

The data processing apparatus 300 according to this embodiment of the present disclosure may correspond to a transmit end device (for example, a network device) in the method in the embodiment of the present disclosure, and the units or the modules and the foregoing other operations and/or functions in the data processing apparatus 300 are separately used to implement corresponding procedures of the method 200 in FIG. 2. For brevity, details are not described herein again.

According to the data processing apparatus 300 in this embodiment of the present disclosure, a transmit end device may obtain multiple precoding matrixes respectively corresponding to multiple layers of modulation symbols, perform precoding processing on the corresponding modulation symbols based on the multiple precoding matrixes in order to obtain a component of each layer of modulation symbol for each space domain resource, and perform superposition processing on the precoded multiple layers of modulation symbols in order to effectively use a space diversity gain, improve a signal-to-noise ratio of a generated to-be-transmitted signal corresponding to each space domain resource, and reduce a bit error rate when a receive end performs decoding such that communication reliability can be improved significantly.

Figure 6:
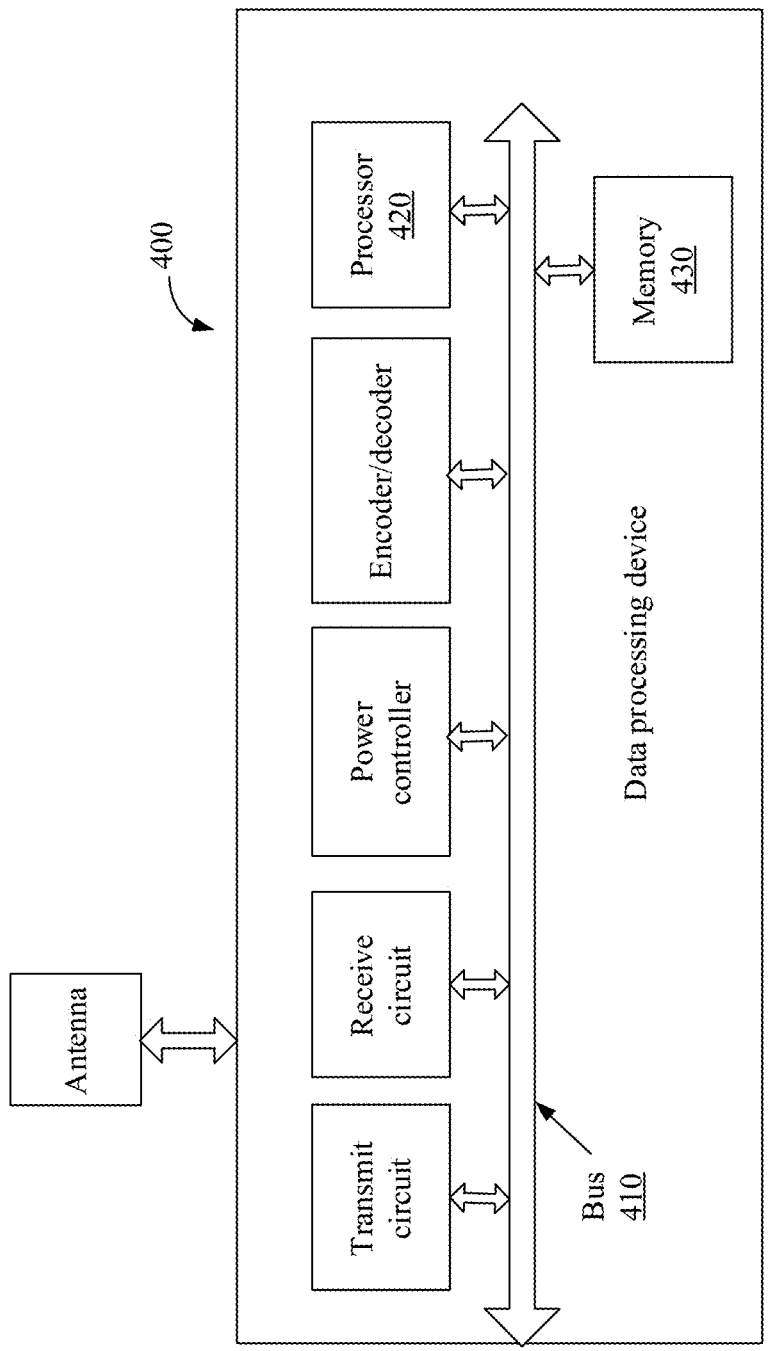
FIG. 6 is a schematic structural diagram of a data processing device according to an embodiment of the present disclosure.

The foregoing describes in detail a data processing method according to the embodiments of the present disclosure with reference to FIG. 1 to FIG. 4, and the following describes in detail a data processing device according to the embodiments of the present disclosure with reference to FIG. 6.

FIG. 6 is a schematic block diagram of a data processing device 400 according to an embodiment of the present disclosure. As shown in FIG. 6, the device 400 includes a bus 410, a processor 420 connected to the bus 410, and a memory 430 connected to the bus 410, where the processor 420 invokes, using the bus 410, a program stored in the memory 430 in order to perform mapping processing on L layers of information bits in order to generate L layers of modulation symbol sequences, where each layer of modulation symbol sequence includes U modulation symbols, the L layers of modulation symbol sequences correspond to a same time-frequency resource, the U modulation symbols include at least one non-zero modulation symbol and at least one zero modulation symbol, L≥2, and U≥2, perform precoding processing on each layer of modulation symbol sequence according to a precoding matrix that corresponds to each layer of modulation symbol sequence and that is in L precoding matrixes in order to generate L layers of modulation symbol sequence matrixes, where the L precoding matrixes are in a one-to-one correspondence to the L layers of modulation symbol sequences, the precoding matrix includes T element sequences in a first dimension, T is a quantity of space domain resources used to transmit the L layers of information bits, and T≥2, and perform superposition processing on the L layers of modulation symbol sequence matrixes in order to generate a to-be-sent symbol sequence matrix, where the to-be-sent symbol sequence matrix includes T element sequences in the first dimension, and the to-be-sent symbol sequence matrix includes U element sequences in a second dimension.

Optionally, when a first modulation symbol sequence in the L layers of modulation symbol sequences includes at least two non-zero modulation symbols, in a first precoding matrix corresponding to the first modulation symbol, the first precoding matrix includes at least two first element sequences in the second dimension, the at least two first element sequences are in a one-to-one correspondence to the at least two non-zero modulation symbols included in the first modulation symbol sequence, and the at least two first element sequences are different.

Optionally, the precoding matrix is determined according to a receive end device corresponding to each layer of modulation symbol sequence.

Optionally, when a receive end device corresponding to a second modulation symbol sequence in the L layers of modulation symbol sequences is the same as a receive end device corresponding to a third modulation symbol sequence in the L layers of modulation symbol sequences, in a second precoding matrix corresponding to the second modulation symbol sequence, the second precoding matrix includes a second element sequence in the second dimension, the second element sequence corresponds to a second non-zero modulation symbol, and the second non-zero modulation symbol is a non-zero modulation symbol included in the second modulation symbol sequence, and in a third precoding matrix corresponding to the third modulation symbol sequence, the third precoding matrix includes a third element sequence in the second dimension, the third element sequence corresponds to a third non-zero modulation symbol, and the third non-zero modulation symbol is a non-zero modulation symbol included in the third modulation symbol sequence, where a location of the second non-zero modulation symbol in the second modulation symbol sequence corresponds to a location of the third non-zero modulation symbol in the third modulation symbol sequence, and the second element sequence is the same as the third element sequence.

Optionally, when a receive end device corresponding to a fourth modulation symbol sequence in the L layers of modulation symbol sequences is different from a receive end device corresponding to a fifth modulation symbol sequence in the L layers of modulation symbol sequences, in a fourth precoding matrix corresponding to the fourth modulation symbol sequence, the fourth precoding matrix includes a fourth element sequence in the second dimension, the fourth element sequence corresponds to a fourth non-zero modulation symbol, and the fourth non-zero modulation symbol is a non-zero modulation symbol included in the fourth modulation symbol sequence, and in a fifth precoding matrix corresponding to the fifth modulation symbol sequence, the fifth precoding matrix includes a fifth element sequence in the second dimension, the fifth element sequence corresponds to a fifth non-zero modulation symbol, and the fifth non-zero modulation symbol is a non-zero modulation symbol included in the fifth modulation symbol sequence, where a location of the fourth non-zero modulation symbol in the fourth modulation symbol sequence corresponds to a location of the fifth non-zero modulation symbol in the fifth modulation symbol sequence, and the fourth element sequence is different from the fifth element sequence.

Optionally, each precoding matrix includes U element sequences in the second dimension, and a location, in the U sequences, of a non-zero element sequence included in each precoding matrix corresponds to a location, in the U modulation symbols, of a non-zero modulation symbol included in a corresponding modulation symbol sequence, and the processor 420 is further configured to perform superposition processing on elements that have corresponding locations in the first dimension and corresponding locations in the second dimension and that are in the L layers of modulation symbol sequence matrixes.

Optionally, a sixth modulation symbol sequence in the L layers of modulation symbol sequences includes V non-zero modulation symbols, V≥1, and in a sixth precoding matrix corresponding to the sixth modulation symbol sequence, the sixth precoding matrix includes V element sequences in a second dimension, and the processor 420 is further configured to perform precoding processing on the first modulation symbol sequence according to the first precoding matrix in order to generate a first modulation symbol sequence matrix, where the first modulation symbol sequence matrix includes T element sequences in the first dimension, and the first modulation symbol sequence matrix includes V element sequences in the second dimension.

Optionally, before performing superposition processing on the L layers of modulation symbol sequence matrixes, the processor 420 is further configured to perform zero-fill processing on the sixth modulation symbol sequence matrix according to locations of the V non-zero modulation symbols in the sixth modulation symbol sequence such that a sixth modulation symbol sequence matrix obtained after zero-fill processing includes U element sequences in the second dimension, where locations, in the second dimension, of V non-zero element sequences in the first modulation symbol sequence matrix obtained after zero-fill processing correspond to the locations of the V non-zero modulation symbols in the sixth modulation symbol sequence.

Optionally, T is a quantity of antenna ports used to transmit the L layers of information bits.

Optionally, the data processing device 400 is a network device, or a terminal device.

Optionally, the processor 420 is further configured to perform mapping processing using a codeword, where the codeword is a multi-dimensional complex vector used to indicate a mapping relationship between an information bit and at least two modulation symbols, and the at least two modulation symbols include at least one zero modulation symbol and at least one non-zero modulation symbol.

This embodiment of the present disclosure may be applied to various communications devices, for example, a network side device or a terminal device.

A receiver (not shown) of the data processing device 400 may include a receive circuit, a power controller, a decoder, and an antenna, and the data processing device 400 may further include a transmitter, and the receiver may include a transmit circuit, a power controller, an encoder, and an antenna.

The processor 420 may further be referred to as a central processing unit (CPU). The memory 430 may include a read-only memory (ROM) and a random access memory (RAM), and provide an instruction and data to the processor 420. A part of the memory 430 may further include a non-volatile random access memory (NVRAM). In a specific application, the data processing device 400 may be embedded into or may be a radio communications device such as a mobile phone or a network device such as a network side device, or may include a carrier containing a transmit circuit and a receive circuit in order to allow data transmitting and receiving between the data processing device 400 and a remote location. The transmit circuit and the receive circuit may be coupled to an antenna. Components of the data processing device 400 are coupled together using a bus 410, where the bus 410 may include a power bus, a control bus, and a status signal bus in addition to a data bus. However, for clear description, various buses are marked as the bus 410 in the figure. Further, decoders in different products may be integrated with a processing unit.

The processor 420 may implement or perform steps and logical block diagrams disclosed in the method embodiment of the present disclosure. A general purpose processor may be a microprocessor or the processor may be any conventional processor, decoder, or the like. With reference to the method disclosed in the embodiments of the present disclosure, steps may be directly implemented by a hardware processor, or implemented by a combination of hardware and software modules in a decoding processor. The software modules may be located in a mature storage medium in the field, such as a RAM, a flash memory, a ROM, a programmable read-only memory, an electrically-erasable programmable memory, or a register.

It should be understood that in this embodiment of the present disclosure, the processor 420 may be a CPU, or the processor 420 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor 420 may be any conventional processor or the like.

The memory 430 may include a ROM and a RAM, and provides an instruction and data to the processor 420. A part of the memory 430 may further include an NVRAM. For example, the memory 430 may further store device type information.

The bus 410 may include a power bus, a control bus, a status signal bus, and the like in addition to a data bus. However, for clear description, various buses are marked as the bus system 410 in the FIG. 6.

In an implementation process, the steps of the foregoing method may be completed using an integrated logical circuit of hardware in the processor 420 or an instruction in the form of software. Steps of the method disclosed with reference to the embodiments of the present disclosure may be directly performed and completed by means of a hardware processor, or may be performed and completed using a combination of hardware and software modules in the processor 420. The software module may be located in a mature storage medium in the field, such as a RAM, a flash memory, a ROM, a programmable ROM, an electrically-erasable programmable memory, or a register. The storage medium is located in the memory 430, and the processor 420 reads information in the memory 430 and completes the steps of the foregoing method in combination with hardware of the processor 420. To avoid repetition, details are not described herein again.

The data processing device 400 according to this embodiment of the present disclosure may correspond to a transmit end device (for example, a network device) in the method in the embodiment of the present disclosure, and the units, that is, the modules and the foregoing other operations and/or functions in the data processing device 400 are separately used to implement corresponding procedures of the method 200 in FIG. 2. For brevity, details are not described herein again.

According to the data processing device 400 in this embodiment of the present disclosure, a transmit end device may obtain multiple precoding matrixes respectively corresponding to multiple layers of modulation symbols, perform precoding processing on the corresponding modulation symbols based on the multiple precoding matrixes in order to obtain a component of each layer of modulation symbol for each space domain resource, and perform superposition processing on the precoded multiple layers of modulation symbols in order to effectively use a space diversity gain, improve a signal-to-noise ratio of a generated to-be-transmitted signal corresponding to each space domain resource, and reduce a bit error rate when a receive end performs decoding such that communication reliability can be improved significantly.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes in the embodiments of the present disclosure.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, comprising:
    performing, by a transmit end device, mapping processing on L layers of information bits to generate L layers of modulation symbol sequences, wherein each layer of modulation symbol sequence comprises U modulation symbols, wherein the L layers of modulation symbol sequences correspond to a same time-frequency resource, wherein the U modulation symbols comprise at least one non-zero modulation symbol and at least one zero modulation symbol, wherein L≥2, and wherein U≥2;

performing precoding processing on each layer of modulation symbol sequence according to a precoding matrix corresponding to each layer of modulation symbol sequence in L precoding matrixes to generate L layers of modulation symbol sequence matrixes, wherein the L precoding matrixes are in a one-to-one correspondence to the L layers of modulation symbol sequences, wherein the precoding matrix comprises T element sequences in a first dimension, wherein T is a quantity of space domain resources transmitting the L layers of information bits, and wherein T≥2; and performing superposition processing on the L layers of modulation symbol sequence matrixes to generate a to-be-sent symbol sequence matrix, wherein the to-be-sent symbol sequence matrix comprises the T element sequences in the first dimension, and U element sequences in a second dimension.

2. The method according to claim 1, wherein when a first modulation symbol sequence in the L layers of modulation symbol sequences comprises at least two non-zero modulation symbols, in a first precoding matrix corresponding to the first modulation symbol sequence, the first precoding matrix comprises at least two first element sequences in the second dimension, wherein the at least two first element sequences are in a one-to-one correspondence to the at least two non-zero modulation symbols comprised in the first modulation symbol sequence, and wherein the at least two first element sequences are different.

3. The method according to claim 1, wherein the precoding matrix is determined according to a receive end device corresponding to each layer of modulation symbol sequence.

4. The method according to claim 3, wherein when a receive end device corresponding to a second modulation symbol sequence in the L layers of modulation symbol sequences is the same as a receive end device corresponding to a third modulation symbol sequence in the L layers of modulation symbol sequences, wherein in a second precoding matrix corresponding to the second modulation symbol sequence, the second precoding matrix comprises a second element sequence in the second dimension, the second element sequence corresponds to a second non-zero modulation symbol, and the second non-zero modulation symbol is a non-zero modulation symbol comprised in the second modulation symbol sequence, wherein in a third precoding matrix corresponding to the third modulation symbol sequence, the third precoding matrix comprises a third element sequence in the second dimension, the third element sequence corresponds to a third non-zero modulation symbol, and the third non-zero modulation symbol is a non-zero modulation symbol comprised in the third modulation symbol sequence, wherein a location of the second non-zero modulation symbol in the second modulation symbol sequence corresponds to a location of the third non-zero modulation symbol in the third modulation symbol sequence, and wherein the second element sequence is the same as the third element sequence.

5. The method according to claim 3, wherein when a receive end device corresponding to a fourth modulation symbol sequence in the L layers of modulation symbol sequences is different from a receive end device corresponding to a fifth modulation symbol sequence in the L layers of modulation symbol sequences, wherein in a fourth precoding matrix corresponding to the fourth modulation symbol sequence, the fourth precoding matrix comprises a fourth element sequence in the second dimension, the fourth element sequence corresponds to a fourth non-zero modulation symbol, and the fourth non-zero modulation symbol is a non-zero modulation symbol comprised in the fourth modulation symbol sequence, wherein in a fifth precoding matrix corresponding to the fifth modulation symbol sequence, the fifth precoding matrix comprises a fifth element sequence in the second dimension, the fifth element sequence corresponds to a fifth non-zero modulation symbol, and the fifth non-zero modulation symbol is a non-zero modulation symbol comprised in the fifth modulation symbol sequence, wherein a location of the fourth non-zero modulation symbol in the fourth modulation symbol sequence corresponds to a location of the fifth non-zero modulation symbol in the fifth modulation symbol sequence, and wherein the fourth element sequence is different from the fifth element sequence.

6. The method according to claim 5, wherein each precoding matrix comprises the U element sequences in the second dimension, wherein a location, in the U element sequences, of a non-zero element sequence comprised in each precoding matrix corresponds to a location, in the U modulation symbols, of a non-zero modulation symbol comprised in a corresponding modulation symbol sequence, and wherein performing the superposition processing on the L layers of modulation symbol sequence matrixes comprises performing superposition processing on elements that have corresponding locations in the first dimension and corresponding locations in the second dimension in the L layers of modulation symbol sequence matrixes.

7. The method according to claim 5, wherein a sixth modulation symbol sequence in the L layers of modulation symbol sequences comprises V non-zero modulation symbols, wherein V≥1, wherein in a sixth precoding matrix corresponding to the sixth modulation symbol sequence, the sixth precoding matrix comprises V element sequences in the second dimension, wherein performing the precoding processing on each layer of modulation symbol sequence according to the precoding matrix corresponding to each layer of modulation symbol sequence comprises performing precoding processing on a first modulation symbol sequence according to a first precoding matrix to generate a first modulation symbol sequence matrix, and wherein the first modulation symbol sequence matrix comprises the T element sequences in the first dimension, and the V element sequences in the second dimension.

8. The method according to claim 7, wherein before performing the superposition processing on the L layers of modulation symbol sequence matrixes, the method further comprises performing zero-fill processing on a sixth modulation symbol sequence matrix according to locations of the V non-zero modulation symbols in the sixth modulation symbol sequence such that the sixth modulation symbol sequence matrix obtained after the zero-fill processing comprises the U element sequences in the second dimension, wherein locations, in the second dimension, of V non-zero element sequences in the sixth modulation symbol sequence matrix obtained after the zero-fill processing correspond to the locations of the V non-zero modulation symbols in the sixth modulation symbol sequence.

9. The method according to claim 1, wherein T is a quantity of antenna ports transmitting the L layers of information bits.

10. The method according to claim 1, wherein the transmit end device is a network device or a terminal device.

11. A data processing apparatus, comprising:
a memory comprising instructions; and
a processor coupled to the memory, wherein the instructions cause the processor to be configured to:
perform mapping processing on L layers of information bits to generate L layers of modulation symbol sequences, wherein each layer of modulation symbol sequence comprises U modulation symbols, wherein the L layers of modulation symbol sequences correspond to a same time-frequency resource, wherein the U modulation symbols comprise at least one non-zero modulation symbol and at least one zero modulation symbol, wherein L≥2, and wherein U≥2;
perform precoding processing on each layer of modulation symbol sequence according to a precoding matrix corresponding to each layer of modulation symbol sequence in L precoding matrixes to generate L layers of modulation symbol sequence matrixes, wherein the L precoding matrixes are in a one-to-one correspondence to the L layers of modulation symbol sequences, wherein the precoding matrix comprises T element sequences in a first dimension, wherein T is a quantity of space domain resources transmitting the L layers of information bits, and wherein T≥2; and
perform superposition processing on the L layers of modulation symbol sequence matrixes to generate a to-be-sent symbol sequence matrix, wherein the to-be-sent symbol sequence matrix comprises the T element sequences in the first dimension, and U element sequences in a second dimension.

12. The apparatus according to claim 11, wherein when a first modulation symbol sequence in the L layers of modulation symbol sequences comprises at least two non-zero modulation symbols, in a first precoding matrix corresponding to the first modulation symbol sequence, the first precoding matrix comprises at least two first element sequences in the second dimension, wherein the at least two first element sequences are in a one-to-one correspondence to the at least two non-zero modulation symbols comprised in the first modulation symbol sequence, and wherein the at least two first element sequences are different.

13. The apparatus according to claim 11, wherein the precoding matrix is determined according to a receive end device corresponding to each layer of modulation symbol sequence.

14. The apparatus according to claim 13, wherein when a receive end device corresponding to a second modulation symbol sequence in the L layers of modulation symbol sequences is the same as a receive end device corresponding to a third modulation symbol sequence in the L layers of modulation symbol sequences, wherein in a second precoding matrix corresponding to the second modulation symbol sequence, the second precoding matrix comprises a second element sequence in the second dimension, the second element sequence corresponds to a second non-zero modulation symbol, and the second non-zero modulation symbol is a non-zero modulation symbol comprised in the second modulation symbol sequence, wherein in a third preceding matrix corresponding to the third modulation symbol sequence, the third precoding matrix comprises a third element sequence in the second dimension, the third element sequence corresponds to a third non-zero modulation symbol, and the third non-zero modulation symbol is a non-zero modulation symbol comprised in the third modulation symbol sequence, wherein a location of the second non-zero modulation symbol in the second modulation symbol sequence corresponds to a location of the third non-zero modulation symbol in the third modulation symbol sequence, and wherein the second element sequence is the same as the third element sequence.

15. The apparatus according to claim 13, wherein when a receive end device corresponding to a fourth modulation symbol sequence in the L layers of modulation symbol sequences is different from a receive end device corresponding to a fifth modulation symbol sequence in the L layers of modulation symbol sequences, wherein in a fourth precoding matrix corresponding to the fourth modulation symbol sequence, the fourth preceding matrix comprises a fourth element sequence in the second dimension, the fourth element sequence corresponds to a fourth non-zero modulation symbol, and the fourth non-zero modulation symbol is a non-zero modulation symbol comprised in the fourth modulation symbol sequence, wherein in a fifth precoding matrix corresponding to the fifth modulation symbol sequence, the fifth precoding matrix comprises a fifth element sequence in the second dimension, the fifth element sequence corresponds to a fifth non-zero modulation symbol, and the fifth non-zero modulation symbol is a non-zero modulation symbol comprised in the fifth modulation symbol sequence, wherein a location of the fourth non-zero modulation symbol in the fourth modulation symbol sequence corresponds to a location of the fifth non-zero modulation symbol in the fifth modulation symbol sequence, and wherein the fourth element sequence is different from the fifth element sequence.

16. The apparatus according to claim 15, wherein each precoding matrix comprises the U element sequences in the second dimension, wherein a location, in the U element sequences, of a non-zero element sequence comprised in each precoding matrix corresponds to a location, in the U modulation symbols, of a non-zero modulation symbol comprised in a corresponding modulation symbol sequence, and wherein the instructions further cause the processor to be configured to perform the superposition processing on elements that have corresponding locations in the first dimension and corresponding locations in the second dimension in the L layers of modulation symbol sequence matrixes.

17. The apparatus according to claim 15, wherein a sixth modulation symbol sequence in the L layers of modulation symbol sequences comprises V non-zero modulation symbols, wherein V≥1, wherein in a sixth precoding matrix corresponding to the sixth modulation symbol sequence, the sixth precoding matrix comprises V element sequences in the second dimension, wherein the instructions further cause the processor to be configured to perform the precoding processing on a first modulation symbol sequence according to a first precoding matrix to generate a first modulation symbol sequence matrix, and wherein the first modulation symbol sequence matrix comprises the T element sequences in the first dimension, and the V element sequences in the second dimension.

18. The apparatus according to claim 17, wherein before performing the superposition processing on the L layers of modulation symbol sequence matrixes, the instructions further cause the processor to be configured to perform zero-fill processing on a sixth modulation symbol sequence matrix according to locations of the V non-zero modulation symbols in the sixth modulation symbol sequence such that the sixth modulation symbol sequence matrix obtained after the zero-fill processing comprises the U element sequences in the second dimension, wherein locations, in the second dimension, of V non-zero element sequences in the first modulation symbol sequence matrix obtained after the zero-fill processing correspond to the locations of the V non-zero modulation symbols in the sixth modulation symbol sequence.

19. The apparatus according to claim 11, wherein T is a quantity of antenna ports transmitting the L layers of information bits.

20. The apparatus according to claim 11, wherein the apparatus is a network device or a terminal device.

* * * * *

UNITED STATES PATENT AND TRADEMARK OFFICE
CERTIFICATE OF CORRECTION

| | | |
|---|---|---|
| PATENT NO. | : 9,900,078 B2 | Page 1 of 1 |
| APPLICATION NO. | : 15/620041 | |
| DATED | : February 20, 2018 | |
| INVENTOR(S) | : Yiqun Wu, Shunqing Zhang and Yan Chen | |

It is certified that error appears in the above-identified patent and that said Letters Patent is hereby corrected as shown below:

Column 35; Line 59; Claim 14 should read:
modulation symbol sequence, wherein in a third precoding Column 36; Line 12; Claim 15 should read:
sequence, the fourth precoding matrix comprises a fourth Signed and Sealed this
Twenty-ninth Day of May, 2018

Andrei Iancu
*Director of the United States Patent and Trademark Office*